United States Patent
Ahn et al.

(10) Patent No.: US 10,542,028 B2
(45) Date of Patent: *Jan. 21, 2020

(54) RULE-BASED NETWORK-THREAT DETECTION

(71) Applicant: Centripetal Networks, Inc., Portsmouth, NH (US)

(72) Inventors: David K. Ahn, Winston-Salem, NC (US); Keith A. George, Fort Royal, VA (US); Peter P. Geremia, Portsmouth, NH (US); Pierre Mallett, III, Herndon, VA (US); Sean Moore, Hollis, NH (US); Robert T. Perry, Ashburn, VA (US); Jonathan R. Rogers, Hampton Falls, NH (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,252

(22) Filed: Aug. 28, 2019

(65) Prior Publication Data

US 2019/0387013 A1  Dec. 19, 2019

Related U.S. Application Data

(63) Continuation of application No. 16/217,720, filed on Dec. 12, 2018, which is a continuation of application
(Continued)

(51) Int. Cl.
*G06F 11/00* (2006.01)
*H04L 29/06* (2006.01)
(Continued)

(52) U.S. Cl.
CPC ...... *H04L 63/1425* (2013.01); *H04L 63/0227* (2013.01); *H04L 63/0236* (2013.01);
(Continued)

(58) Field of Classification Search
CPC . H04L 63/0227; H04L 63/20; H04L 63/0263; H04L 63/1408; H04L 63/0236;
(Continued)

(56) References Cited

U.S. PATENT DOCUMENTS 6,098,172 A * 8/2000 Coss ................... H04L 63/0254
726/11
6,147,976 A * 11/2000 Shand ............... H04L 29/12009
370/254
(Continued)

FOREIGN PATENT DOCUMENTS

AU  2005328336 B2  9/2011
AU  2006230171 B2  6/2012
(Continued)

OTHER PUBLICATIONS

Oct. 4, 2018 U.S. Non-Final Office Action—U.S. Appl. No. 16/030,374.
(Continued)

*Primary Examiner* — Gary S Gracia
(74) *Attorney, Agent, or Firm* — Banner & Witcoff, Ltd.

(57) ABSTRACT

A packet-filtering device may receive packet-filtering rules configured to cause the packet-filtering device to identify packets corresponding to network-threat indicators. The packet-filtering device may receive packets and, for each packet, may determine that the packet corresponds to criteria specified by a packet-filtering rule. The criteria may correspond to one or more of the network-threat indicators. The packet-filtering device may apply an operator specified by the packet-filtering rule. The operator may be configured to cause the packet-filtering device to either prevent the packet from continuing toward its destination or allow the packet to continue toward its destination. The packet-filtering device may generate a log entry comprising information from the packet-filtering rule that identifies the one or more network-threat indicators and indicating whether the packet-filtering
(Continued)

device prevented the packet from continuing toward its destination or allowed the packet to continue toward its destination.

21 Claims, 27 Drawing Sheets

Related U.S. Application Data

No. 15/827,477, filed on Nov. 30, 2017, now Pat. No. 10,193,917, which is a continuation of application No. 14/690,302, filed on Apr. 17, 2015, now Pat. No. 9,866,576.

(51) Int. Cl.
*G06F 12/14* (2006.01)
*H04L 12/26* (2006.01)

(52) U.S. Cl.
CPC .......... *H04L 63/0263* (2013.01); *H04L 63/12* (2013.01); *H04L 63/1416* (2013.01); *H04L 63/1441* (2013.01); *H04L 43/028* (2013.01)

(58) Field of Classification Search
CPC . H04L 63/1416; H04L 63/02; H04L 63/1425; H04L 63/1441; H04L 63/164; H04L 63/029; H04L 63/0254; H04L 63/14; H04L 63/168; H04L 63/162; H04L 2463/141; H04L 63/1483; H04L 2463/144; H04L 2463/142; H04L 2463/145

See application file for complete search history.

(56) References Cited

U.S. PATENT DOCUMENTS

| | | | | |
|---|---|---|---|---|
| 6,226,372 B1* | 5/2001 | Beebe | ................ | H04L 63/0218 379/145 |
| 6,279,113 B1* | 8/2001 | Vaidya | ................ | H04L 63/1416 709/229 |
| 6,317,837 B1* | 11/2001 | Kenworthy | ......... | H04L 63/0209 726/11 |
| 6,484,261 B1* | 11/2002 | Wiegel | ................ | H04L 41/0856 715/763 |
| 6,611,875 B1* | 8/2003 | Chopra | ................ | H04L 29/06 709/238 |
| 6,662,235 B1* | 12/2003 | Callis | ................ | H04L 41/0681 709/223 |
| 6,826,694 B1* | 11/2004 | Dutta | ................ | H04L 63/0245 726/13 |
| 6,907,042 B1* | 6/2005 | Oguchi | ................ | H04L 47/30 370/230 |
| 6,971,028 B1* | 11/2005 | Lyle | ................ | G06F 21/554 709/224 |
| 7,089,581 B1* | 8/2006 | Nagai | ................ | G06Q 99/00 713/166 |
| 7,095,716 B1* | 8/2006 | Ke | ................ | H04L 63/0272 370/230 |
| 7,107,613 B1* | 9/2006 | Chen | ................ | H04L 63/029 709/241 |
| 7,143,438 B1* | 11/2006 | Coss | ................ | H04L 29/06 726/11 |
| 7,152,240 B1* | 12/2006 | Green | ................ | H04L 63/02 726/4 |
| 7,185,368 B2* | 2/2007 | Copeland, III | ....... | G06F 21/552 705/51 |
| 7,215,637 B1* | 5/2007 | Ferguson | ................ | H04L 45/00 370/230.1 |
| 7,225,269 B2* | 5/2007 | Watanabe | ........... | H04L 63/0263 709/238 |
| 7,227,842 B1* | 6/2007 | Ji | ............. | H04L 45/00 370/235 |
| 7,237,267 B2* | 6/2007 | Rayes | ..................... | H04L 63/20 713/165 |
| 7,263,099 B1* | 8/2007 | Woo | ..................... | H04L 12/1854 370/390 |
| 7,296,288 B1* | 11/2007 | Hill | ..................... | H04L 41/0896 713/194 |
| 7,299,353 B2* | 11/2007 | Le Pennec | ............ | H04L 41/042 713/159 |
| 7,331,061 B1* | 2/2008 | Ramsey | ............... | H04L 63/0218 726/11 |
| 7,478,429 B2* | 1/2009 | Lyon | ................. | H04L 29/06027 726/2 |
| 7,499,412 B2* | 3/2009 | Matityahu | ............... | H04L 41/22 370/255 |
| 7,539,186 B2* | 5/2009 | Aerrabotu | ......... | H04L 29/12009 370/389 |
| 7,610,621 B2* | 10/2009 | Turley | ................ | H04L 63/0263 726/11 |
| 7,684,400 B2* | 3/2010 | Govindarajan | ......... | H04L 47/10 370/392 |
| 7,710,885 B2* | 5/2010 | Ilnicki | ..................... | H04L 45/42 370/241 |
| 7,721,084 B2* | 5/2010 | Salminen | ............. | H04L 63/0236 713/150 |
| 7,792,775 B2* | 9/2010 | Matsuda | ............. | H04L 63/0263 706/47 |
| 7,814,158 B2* | 10/2010 | Malik | .................. | G06Q 10/107 709/206 |
| 7,814,546 B1* | 10/2010 | Strayer | ............... | H04L 63/1416 726/23 |
| 7,818,794 B2* | 10/2010 | Wittman | ............... | G06F 21/554 380/266 |
| 7,849,502 B1* | 12/2010 | Bloch | ............... | H04L 29/12066 726/11 |
| 7,913,303 B1* | 3/2011 | Rouland | ............. | H04L 63/1433 726/22 |
| 7,954,143 B2* | 5/2011 | Aaron | .................. | H04L 63/102 713/166 |
| 8,004,994 B1* | 8/2011 | Darisi | ..................... | H04L 1/203 370/241 |
| 8,009,566 B2* | 8/2011 | Zuk | .................... | H04L 63/0227 370/235 |
| 8,037,517 B2* | 10/2011 | Fulp | .................... | H04L 63/0263 726/11 |
| 8,042,167 B2* | 10/2011 | Fulp | ....................... | H04L 63/20 370/351 |
| 8,117,655 B2* | 2/2012 | Spielman | ................ | H04L 43/00 726/12 |
| 8,156,206 B2* | 4/2012 | Kiley | ..................... | H04L 67/306 709/220 |
| 8,176,561 B1* | 5/2012 | Hurst | ..................... | H04L 67/36 726/1 |
| 8,219,675 B2* | 7/2012 | Ivershen | ............. | H04L 43/026 709/224 |
| 8,271,645 B2* | 9/2012 | Rajan | ................... | H04L 43/10 370/237 |
| 8,306,994 B2* | 11/2012 | Kenworthy | ......... | H04L 63/0209 707/769 |
| 8,307,029 B2* | 11/2012 | Davis | .................. | G06Q 10/107 709/203 |
| 8,331,234 B1* | 12/2012 | Newton | ................ | H04L 43/026 370/231 |
| 8,422,391 B2* | 4/2013 | Zhu | ........................ | H04L 62/255 370/252 |
| 8,495,725 B2* | 7/2013 | Ahn | .................... | H04L 63/0227 726/11 |
| 8,510,821 B1* | 8/2013 | Brandwine | ......... | H04L 63/1416 709/229 |
| 8,726,379 B1* | 5/2014 | Stiansen | ............. | H04L 63/1491 726/22 |
| 8,806,638 B1* | 8/2014 | Mani | ..................... | H04L 63/0227 726/24 |
| 8,832,832 B1* | 9/2014 | Visbal | ................ | H04L 63/1441 726/22 |

(56) References Cited

U.S. PATENT DOCUMENTS

| | | | |
|---|---|---|---|
| 8,856,926 B2* | 10/2014 | Narayanaswamy | H04L 63/1425 726/23 |
| 8,935,785 B2* | 1/2015 | Pandrangi | H04L 47/10 709/224 |
| 9,094,445 B2* | 7/2015 | Moore | H04L 63/0236 |
| 9,124,552 B2* | 9/2015 | Moore | H04L 67/02 |
| 9,137,205 B2* | 9/2015 | Rogers | H04L 63/0218 |
| 9,154,446 B2* | 10/2015 | Gemelli | H04L 49/1523 |
| 9,160,713 B2* | 10/2015 | Moore | H04L 63/0254 |
| 9,172,627 B2* | 10/2015 | Kjendal | H04L 43/028 |
| 9,419,942 B1* | 8/2016 | Buruganahalli | H04L 63/0227 |
| 9,531,672 B1* | 12/2016 | Li | H04L 63/02 |
| 9,634,911 B2* | 4/2017 | Meloche | H04L 43/04 |
| 9,686,193 B2* | 6/2017 | Moore | H04L 63/0263 |
| 2001/0039579 A1* | 11/2001 | Trcka | G06F 21/552 709/224 |
| 2001/0039624 A1* | 11/2001 | Kellum | G06F 21/567 726/24 |
| 2002/0016858 A1* | 2/2002 | Sawada | H04L 29/12018 709/238 |
| 2002/0038339 A1* | 3/2002 | Xu | H04L 29/06 709/203 |
| 2002/0049899 A1* | 4/2002 | Kenworthy | H04L 63/0209 713/1 |
| 2002/0083345 A1* | 6/2002 | Halliday | H04L 63/0209 726/14 |
| 2002/0112188 A1* | 8/2002 | Syvanne | H04L 63/0263 726/13 |
| 2002/0152209 A1* | 10/2002 | Merugu | H04L 47/10 |
| 2002/0164962 A1* | 11/2002 | Mankins | A61K 38/2221 455/99 |
| 2002/0165949 A1* | 11/2002 | Na | H04L 63/0227 709/223 |
| 2002/0186683 A1* | 12/2002 | Buck | H04L 63/029 370/352 |
| 2002/0198981 A1* | 12/2002 | Corl, Jr. | H04L 29/06 709/224 |
| 2003/0005122 A1* | 1/2003 | Freimuth | H04L 29/06 709/225 |
| 2003/0014665 A1* | 1/2003 | Anderson | H04L 63/0227 726/4 |
| 2003/0018591 A1* | 1/2003 | Komisky | H04L 45/00 706/1 |
| 2003/0035370 A1* | 2/2003 | Brustoloni | H04L 29/06 370/229 |
| 2003/0051026 A1* | 3/2003 | Carter | H04L 41/00 709/224 |
| 2003/0088787 A1* | 5/2003 | Egevang | H04L 29/125 726/7 |
| 2003/0097590 A1* | 5/2003 | Syvanne | H04L 63/0227 726/4 |
| 2003/0105976 A1* | 6/2003 | Copeland, III | G06F 21/552 726/4 |
| 2003/0120622 A1* | 6/2003 | Nurmela | H04L 63/0227 706/47 |
| 2003/0123456 A1* | 7/2003 | Denz | H04L 45/04 370/400 |
| 2003/0142681 A1* | 7/2003 | Chen | H04L 29/06 370/401 |
| 2003/0145225 A1* | 7/2003 | Bruton, III | H04L 63/1408 726/23 |
| 2003/0154297 A1* | 8/2003 | Suzuki | H04L 29/06 709/229 |
| 2003/0154399 A1* | 8/2003 | Zuk | H04L 63/0254 726/11 |
| 2003/0188192 A1* | 10/2003 | Tang | H04L 63/0263 726/13 |
| 2003/0212900 A1* | 11/2003 | Liu | H04L 63/0263 726/13 |
| 2003/0220940 A1* | 11/2003 | Futoransky | G06F 21/552 |
| 2004/0010712 A1* | 1/2004 | Hui | H04L 63/0227 726/15 |
| 2004/0015719 A1* | 1/2004 | Lee | H04L 63/0227 726/23 |
| 2004/0073655 A1* | 4/2004 | Kan | H04L 41/5009 709/224 |
| 2004/0088542 A1* | 5/2004 | Daude | H04L 12/4641 713/156 |
| 2004/0093513 A1* | 5/2004 | Cantrell | H04L 43/00 726/23 |
| 2004/0098511 A1* | 5/2004 | Lin | H04L 67/327 709/249 |
| 2004/0114518 A1* | 6/2004 | MacFaden | H04L 41/0816 370/230.1 |
| 2004/0123220 A1* | 6/2004 | Johnson | H04J 3/1617 714/774 |
| 2004/0131056 A1* | 7/2004 | Dark | H04L 43/00 370/386 |
| 2004/0148520 A1* | 7/2004 | Talpade | H04L 63/0227 726/22 |
| 2004/0151155 A1* | 8/2004 | Jouppi | H04W 76/12 370/349 |
| 2004/0172529 A1* | 9/2004 | Culbert | H04L 41/0806 713/153 |
| 2004/0172557 A1* | 9/2004 | Nakae | H04L 63/0227 726/22 |
| 2004/0177139 A1* | 9/2004 | Schuba | H04L 41/0873 709/223 |
| 2004/0193943 A1* | 9/2004 | Angelino | H04L 63/1408 714/4.1 |
| 2004/0199629 A1* | 10/2004 | Bomer | G06F 11/362 709/224 |
| 2004/0205360 A1* | 10/2004 | Norton | H04L 63/0227 726/23 |
| 2004/0250124 A1* | 12/2004 | Chesla | G06F 21/552 726/13 |
| 2005/0010765 A1* | 1/2005 | Swander | H04L 63/0218 713/166 |
| 2005/0024189 A1* | 2/2005 | Weber | B60R 16/0232 340/425.5 |
| 2005/0071650 A1* | 3/2005 | Jo | G06F 21/55 713/188 |
| 2005/0076227 A1* | 4/2005 | Kang | H04L 63/1416 713/188 |
| 2005/0108557 A1* | 5/2005 | Kayo | H04L 63/1416 713/189 |
| 2005/0114704 A1* | 5/2005 | Swander | H04L 63/0263 726/4 |
| 2005/0117576 A1* | 6/2005 | McDysan | H04L 45/308 370/389 |
| 2005/0125697 A1* | 6/2005 | Tahara | H04L 63/0227 726/4 |
| 2005/0138204 A1* | 6/2005 | Iyer | H04L 12/4641 709/242 |
| 2005/0138353 A1* | 6/2005 | Spies | H04L 63/0442 713/153 |
| 2005/0141537 A1* | 6/2005 | Kumar | H04L 12/4641 370/429 |
| 2005/0183140 A1* | 8/2005 | Goddard | H04L 63/0218 726/11 |
| 2005/0229246 A1* | 10/2005 | Rajagopal | H04L 63/0236 726/14 |
| 2005/0249214 A1* | 11/2005 | Peng | H04L 63/1458 709/224 |
| 2005/0251570 A1* | 11/2005 | Heasman | G06F 21/55 709/224 |
| 2005/0283823 A1* | 12/2005 | Okajo | G06F 21/604 726/1 |
| 2005/0286522 A1* | 12/2005 | Paddon | H04L 63/0227 370/389 |
| 2006/0031928 A1* | 2/2006 | Conley | H04L 63/0236 726/11 |
| 2006/0048142 A1* | 3/2006 | Roese | H04L 41/0893 717/176 |
| 2006/0053491 A1* | 3/2006 | Khuti | H04L 63/02 726/23 |

(56) References Cited

U.S. PATENT DOCUMENTS

| | | | |
|---|---|---|---|
| 2006/0070122 A1* | 3/2006 | Bellovin | H04L 63/0236 726/14 |
| 2006/0080733 A1* | 4/2006 | Khosmood | H04L 63/0263 726/13 |
| 2006/0085849 A1* | 4/2006 | Culbert | H04L 63/0254 726/13 |
| 2006/0104202 A1* | 5/2006 | Reiner | G06F 9/542 370/230 |
| 2006/0114899 A1* | 6/2006 | Toumura | H04L 49/3009 370/389 |
| 2006/0133377 A1* | 6/2006 | Jain | H04L 63/1408 370/392 |
| 2006/0136987 A1* | 6/2006 | Okuda | H04L 29/06 726/1 |
| 2006/0137009 A1* | 6/2006 | Chesla | G06F 21/552 726/22 |
| 2006/0146879 A1* | 7/2006 | Anthias | H04L 69/22 370/471 |
| 2006/0159028 A1* | 7/2006 | Curran-Gray | H04L 43/026 370/252 |
| 2006/0195896 A1* | 8/2006 | Fulp | H04L 63/0263 726/11 |
| 2006/0212572 A1* | 9/2006 | Afek | H04L 63/145 709/225 |
| 2006/0248580 A1* | 11/2006 | Fulp | H04L 63/0263 726/11 |
| 2006/0262798 A1* | 11/2006 | Joshi | H04L 12/4641 370/392 |
| 2007/0056038 A1* | 3/2007 | Lok | H04L 63/1416 726/23 |
| 2007/0083924 A1* | 4/2007 | Lu | H04L 63/0227 726/13 |
| 2007/0118894 A1* | 5/2007 | Bhatia | H04L 63/1458 726/13 |
| 2007/0211644 A1* | 9/2007 | Ottamalika | H04L 41/22 370/252 |
| 2007/0240208 A1* | 10/2007 | Yu | H04L 63/0236 726/13 |
| 2007/0291789 A1* | 12/2007 | Kutt | G06Q 30/00 370/467 |
| 2008/0005795 A1* | 1/2008 | Acharya | H04L 63/0263 726/23 |
| 2008/0028467 A1* | 1/2008 | Kommareddy | H04L 63/1458 726/23 |
| 2008/0043739 A1* | 2/2008 | Suh | H04W 8/082 370/392 |
| 2008/0072307 A1* | 3/2008 | Maes | H04L 63/029 726/12 |
| 2008/0077705 A1* | 3/2008 | Li | H04L 47/10 709/236 |
| 2008/0080493 A1* | 4/2008 | Weintraub | H04L 63/0263 370/389 |
| 2008/0086435 A1* | 4/2008 | Chesla | H04L 63/1458 706/12 |
| 2008/0101234 A1* | 5/2008 | Nakil | H04L 63/1425 370/235 |
| 2008/0163333 A1* | 7/2008 | Kasralikar | H04L 63/1408 726/1 |
| 2008/0201772 A1* | 8/2008 | Mondaeev | H04L 63/1408 726/13 |
| 2008/0229415 A1* | 9/2008 | Kapoor | G06F 21/55 726/22 |
| 2008/0235755 A1* | 9/2008 | Blaisdell | H04L 63/0227 726/1 |
| 2008/0279196 A1* | 11/2008 | Friskney | H04L 12/4645 370/395.53 |
| 2008/0301765 A1* | 12/2008 | Nicol | H04L 41/142 726/1 |
| 2008/0313738 A1* | 12/2008 | Enderby | G06F 21/554 726/24 |
| 2008/0320116 A1* | 12/2008 | Briggs | H04L 29/12377 709/221 |
| 2009/0028160 A1* | 1/2009 | Eswaran | H04L 45/745 370/395.32 |
| 2009/0138938 A1* | 5/2009 | Harrison | G06F 21/604 726/1 |
| 2009/0150972 A1* | 6/2009 | Moon | H04L 63/102 726/1 |
| 2009/0172800 A1* | 7/2009 | Wool | G06F 21/604 726/11 |
| 2009/0222877 A1* | 9/2009 | Diehl | H04L 63/0263 726/1 |
| 2009/0240698 A1* | 9/2009 | Shukla | G06F 16/20 |
| 2009/0262723 A1* | 10/2009 | Pelletier | H04L 12/66 370/352 |
| 2009/0262741 A1* | 10/2009 | Jungck | H04L 29/12066 370/392 |
| 2009/0300759 A1* | 12/2009 | Wang | H04L 63/101 726/22 |
| 2009/0328219 A1* | 12/2009 | Narayanaswamy | H04L 63/1425 726/23 |
| 2010/0011433 A1* | 1/2010 | Harrison | H04L 63/0263 726/12 |
| 2010/0011434 A1* | 1/2010 | Kay | H04L 43/00 726/14 |
| 2010/0082811 A1* | 4/2010 | Van Der Merwe | G06F 16/9535 709/225 |
| 2010/0095367 A1* | 4/2010 | Narayanaswamy | H04L 63/0245 726/12 |
| 2010/0107240 A1* | 4/2010 | Thaler | H04L 63/107 726/15 |
| 2010/0115621 A1* | 5/2010 | Staniford | H04L 63/1416 726/25 |
| 2010/0132027 A1* | 5/2010 | Ou | H04L 63/0227 726/11 |
| 2010/0195503 A1* | 8/2010 | Raleigh | H04L 41/0806 370/235 |
| 2010/0199346 A1* | 8/2010 | Ling | H04L 63/0263 726/12 |
| 2010/0202299 A1* | 8/2010 | Strayer | H04L 63/1408 370/252 |
| 2010/0211678 A1* | 8/2010 | McDysan | G06F 11/2028 709/225 |
| 2010/0232445 A1* | 9/2010 | Bellovin | H04L 45/02 370/410 |
| 2010/0242098 A1* | 9/2010 | Kenworthy | H04L 63/0209 726/4 |
| 2010/0268799 A1* | 10/2010 | Maestas | H04L 29/12283 709/220 |
| 2010/0296441 A1* | 11/2010 | Barkan | H04W 12/08 370/328 |
| 2010/0303240 A1* | 12/2010 | Beachem | G06F 21/57 380/277 |
| 2011/0055916 A1* | 3/2011 | Ahn | H04L 63/0227 726/13 |
| 2011/0055923 A1* | 3/2011 | Thomas | G06Q 10/107 726/23 |
| 2011/0088092 A1* | 4/2011 | Nguyen | H04L 41/28 726/22 |
| 2011/0141900 A1* | 6/2011 | Jayawardena | H04L 43/028 370/237 |
| 2011/0185055 A1* | 7/2011 | Nappier | H04L 63/1433 709/224 |
| 2011/0214157 A1* | 9/2011 | Korsunsky | G06F 21/55 726/1 |
| 2011/0270956 A1* | 11/2011 | McDysan | G06F 11/2028 709/220 |
| 2011/0277034 A1* | 11/2011 | Hanson | G06F 21/554 726/22 |
| 2012/0023576 A1* | 1/2012 | Sorensen | G06F 21/577 726/22 |
| 2012/0084866 A1* | 4/2012 | Stolfo | G06F 21/554 726/25 |
| 2012/0106354 A1* | 5/2012 | Pleshek | H04L 43/028 370/241 |

(56) References Cited

U.S. PATENT DOCUMENTS

| | | | |
|---|---|---|---|
| 2012/0113987 A1* | 5/2012 | Riddoch | H04L 12/18 370/390 |
| 2012/0240135 A1* | 9/2012 | Risbood | H04L 41/5012 719/328 |
| 2012/0240185 A1* | 9/2012 | Kapoor | H04L 63/1425 726/1 |
| 2012/0264443 A1* | 10/2012 | Ng | H04W 60/04 455/450 |
| 2012/0314617 A1* | 12/2012 | Erichsen | H04L 61/6059 370/254 |
| 2012/0331543 A1* | 12/2012 | Bostrom | H04L 61/2517 726/13 |
| 2013/0047020 A1* | 2/2013 | Hershko | H04L 67/02 713/323 |
| 2013/0059527 A1* | 3/2013 | Hasesaka | H04L 12/66 455/7 |
| 2013/0061294 A1* | 3/2013 | Kenworthy | H04L 63/0209 726/4 |
| 2013/0104236 A1* | 4/2013 | Ray | H04L 63/1433 726/25 |
| 2013/0117852 A1* | 5/2013 | Stute | G06F 21/55 726/23 |
| 2013/0139236 A1* | 5/2013 | Rubinstein | H04L 63/1483 726/7 |
| 2013/0254766 A1* | 9/2013 | Zuo | H04L 43/026 718/1 |
| 2013/0291100 A1* | 10/2013 | Ganapathy | H04W 4/70 726/22 |
| 2013/0305311 A1* | 11/2013 | Puttaswamy Naga | H04L 63/20 726/1 |
| 2014/0075510 A1* | 3/2014 | Sonoda | H04L 63/105 726/3 |
| 2014/0082204 A1* | 3/2014 | Shankar | H04L 63/166 709/227 |
| 2014/0082730 A1* | 3/2014 | Vashist | H04L 63/1416 726/23 |
| 2014/0115654 A1* | 4/2014 | Rogers | H04L 63/0218 726/1 |
| 2014/0150051 A1* | 5/2014 | Bharali | H04L 61/1511 726/1 |
| 2014/0201123 A1* | 7/2014 | Ahn | H04L 63/0263 706/47 |
| 2014/0215561 A1* | 7/2014 | Roberson | H04L 63/08 726/3 |
| 2014/0215574 A1* | 7/2014 | Erb | H04L 63/10 726/4 |
| 2014/0259170 A1* | 9/2014 | Amsler | H04L 63/20 726/23 |
| 2014/0281030 A1* | 9/2014 | Cui | H04L 43/026 709/244 |
| 2014/0283004 A1* | 9/2014 | Moore | H04L 63/0254 726/13 |
| 2014/0283030 A1* | 9/2014 | Moore | H04L 63/0236 726/22 |
| 2014/0317397 A1* | 10/2014 | Martini | H04L 63/1466 713/153 |
| 2014/0337613 A1* | 11/2014 | Martini | H04L 63/04 713/151 |
| 2014/0366132 A1* | 12/2014 | Stiansen | H04L 63/1491 726/22 |
| 2015/0033336 A1* | 1/2015 | Wang | H04L 63/1425 726/23 |
| 2015/0106930 A1* | 4/2015 | Honda | H04L 63/1425 726/23 |
| 2015/0128274 A1* | 5/2015 | Giokas | H04L 63/1416 726/23 |
| 2015/0135325 A1* | 5/2015 | Stevens | H04L 63/1416 726/25 |
| 2015/0207809 A1* | 7/2015 | MacAulay | G06F 21/552 726/22 |
| 2015/0237012 A1* | 8/2015 | Moore | H04L 63/0254 726/1 |
| 2015/0244734 A1* | 8/2015 | Olson | G06F 21/577 726/25 |
| 2015/0256431 A1* | 9/2015 | Buchanan | H04L 67/22 709/224 |
| 2015/0304354 A1* | 10/2015 | Rogers | H04L 63/0218 726/1 |
| 2015/0334125 A1* | 11/2015 | Bartos | H04L 63/1416 726/24 |
| 2015/0341389 A1* | 11/2015 | Kurakami | H04L 63/20 726/1 |
| 2015/0350229 A1* | 12/2015 | Mitchell | G06F 16/955 726/23 |
| 2015/0372977 A1* | 12/2015 | Yin | H04L 63/0236 726/1 |
| 2015/0373043 A1* | 12/2015 | Wang | G06F 21/552 706/12 |
| 2016/0020968 A1* | 1/2016 | Aumann | H04L 43/026 370/252 |
| 2016/0028751 A1* | 1/2016 | Cruz Mota | H04L 63/1408 726/23 |
| 2016/0065611 A1* | 3/2016 | Fakeri-Tabrizi | H04L 63/1425 726/23 |
| 2016/0112443 A1* | 4/2016 | Grossman | H04L 63/1416 726/23 |
| 2016/0119365 A1* | 4/2016 | Barel | G06F 16/35 726/12 |
| 2016/0191558 A1* | 6/2016 | Davison | H04L 63/145 713/171 |
| 2016/0205069 A1* | 7/2016 | Blocher | H04L 63/02 726/12 |
| 2016/0219065 A1* | 7/2016 | Dasgupta | H04L 63/1441 |
| 2016/0285706 A1* | 9/2016 | Rao | H04L 43/028 |
| 2016/0294870 A1* | 10/2016 | Banerjee | H04L 43/067 |
| 2016/0366099 A1* | 12/2016 | Jordan | H04L 63/0227 |
| 2017/0223046 A1* | 8/2017 | Singh | H04L 43/062 |
| 2017/0272469 A1* | 9/2017 | Kraemer | H04L 63/1416 |

FOREIGN PATENT DOCUMENTS

| | | |
|---|---|---|
| CA | 2600236 A1 | 10/2006 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2498442 A1 | 9/2012 |
| EP | 1864226 B1 | 5/2013 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007109541 A2 | 9/2007 |
| WO | 2011038420 A2 | 3/2011 |
| WO | 2012146265 A1 | 11/2012 |

OTHER PUBLICATIONS

Oct. 4, 2018 U.S. Notice of Allowance—U.S. Appl. No. 15/827,477.
Sep. 27, 2018 (WO) International Search Report and Written Opinion—App. PCT/US2018/043367.
Sep. 4, 2018 (WO) International Search Report and Written Opinion—App. PCT/US2018/041355.
Sep. 27, 2018 U.S. Non-Final Office Action—U.S. Appl. No. 15/614,956.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp.

(56) References Cited

OTHER PUBLICATIONS 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al, "An Architecture for Differentiated Services," Network Working Group RFC 2475, Dec. 1998, 36 pages.
C. Benecke, "A Parallel Packet Screen for High Speed Networks", Proceedings of the 15th Annual Computer Security Applications Conference, 1999.
Chen, et al, "Research on the Anomaly Discovering Algorithm of the Packet Filtering Rule Sets," Sep. 2010, First International Conference on Pervasive Computing, Signal Processing and Applications, pp. 362-366.
D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P—Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35,1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDs for Packet Filtering", Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al, "Definition of the Differentiated Services Field (DS Field) in the IPv4 and IPv6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing a Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.

(56) References Cited

OTHER PUBLICATIONS

Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14. 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 U.S. Notice of Allowance—U.S. Appl. No. 14/702,755.
Apr. 15, 2016—U.S. Notice of Allowance—U.S. Appl. No. 14/855,374.
Apr. 26, 2016—U.S. Office Action—U.S. Appl. No. 14/745,207.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Jul. 20, 2017 (US) Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 (US) Defendant Ixia's Partial Answer to Complaint for Patent Infringement—Case No. 2:17-cv-00383-HCN-LRL, Document 29, 14 pages.
Sep. 5, 2017 (US) Memorandum in Support of Defendant's Ixia and Keysight Technologies, Inc's Motion to Dismiss for Unpatentability Under 35 U.S.C § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Aug. 29, 2018 (CA) Office Action—App. 2,888,935.
Aug. 9, 2018 U.S. Non-Final Office Action—U.S. Appl. No. 15/413,947.
Jul. 13, 2018 U.S. Notice of Allowance—U.S. Appl. No. 15/414,117.
Jul. 27, 2018 U.S. Non-Final Office Action—U.S. Appl. No. 15/382,806.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
Nov. 14, 2018 U.S. Final Office Action—U.S. Appl. No. 14/745,207.
Oct. 12, 2018 U.S. Non-Final Office Action—U.S. Appl. No. 16/039,896.
Singh, Rajeev et al. "Detecting and Reducing the Denial of Service attacks in WLANs", Dec. 2011, World Congress on Information and Communication TEchnologies, pp. 968-973.
Sourcefire 3D System User Guide, Version 4.10, Mar. 16, 2011, 2123 pages.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al, "The Secure Shell (SSH) Transport Layer Protocol," SSH Communication Security Corp, Newtork Working Group RFC 4253, Jan. 2006, 32 pages.
Dec. 18, 2018 U.S. Final Office Action—U.S. Appl. No. 15/610,995.

(56) References Cited

OTHER PUBLICATIONS

Jan. 24, 2019 U.S. Notice of Allowance—U.S. Appl. No. 15/610,995.
Feb. 6, 2019 U.S. Final Office Action—U.S. Appl. No. 15/413,750.
Feb. 6, 2019 U.S. Notice of Allowance and Fees Due—U.S. Appl. No. 16/039,896.
Mar. 8, 2019 U.S. Notice of Allowance and Fees Due—U.S. Appl. No. 16/060,374.
Mar. 11, 2019 U.S. Final Office Action—U.S. Appl. No. 16/030,354.
Feb. 21, 2019 U.S. Final Office Action—U.S. Appl. No. 15/382,806.
Mar. 8, 2019 U.S. Notice of Allowance and Fees Due—U.S. Appl. No. 16/030,374.
Mar. 18, 2019 (AU) First Examination Report—App. 2016379156.
Apr. 8, 2019 U.S. Final Office Aciton—U.S. Appl. No. 15/413,947.
Jun. 3, 2019 U.S. Final Office Action—U.S. Appl. No. 15/614,956.
May 23, 2019 U.S. Non-Final Office Action—U.S. Appl. No. 14/745,207.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 U.S. Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.

\* cited by examiner

Rule(s) — 218, 402

Non-Threat-Intel. Rule(s)

| Rule | Criteria | Operator |
|---|---|---|
| NTI001 | <criteria> | <BLOCK> |
| NTI002 | <criteria> | <BLOCK> |
| ... | ... | ... |
| NTI999 | <criteria> | <ALLOW> |

Threat-Intel. Rule(s) — 404

| Rule | Threat ID | Criteria | Operator |
|---|---|---|---|
| TI001 | Threat_1 | <criteria> | <ALLOW> |
| TI002 | Threat_2 | <criteria> | <ALLOW> |
| TI003 | Threat_3 | <criteria> | <ALLOW> |
| TI004 | Threat_4 | <criteria> | <ALLOW> |
| TI005 | Threat_5 | <criteria> | <ALLOW> |
| TI006 | Threat_6 | <criteria> | <ALLOW> |
| TI007 | Threat_7 | <criteria> | <ALLOW> |
| TI008 | Threat_8 | <criteria> | <ALLOW> |
| TI009 | Threat_9 | <criteria> | <ALLOW> |
| ... | ... | ... | ... |
| TI999 | Threat_N | <criteria> | <ALLOW> |

FIG. 4A

Rule(s) 218

Non-Threat-Intel. Rule(s) — 402

| Rule | Criteria | Operator |
|---|---|---|
| NTI001 | <criteria> | <BLOCK> |
| NTI002 | <criteria> | <BLOCK> |
| ... | ... | ... |
| NTI999 | <criteria> | <ALLOW> |

Threat-Intel. Rule(s) — 404

| Rule | Threat ID | Criteria | Operator |
|---|---|---|---|
| TI001 | Threat_1 | <criteria> | <ALLOW> |
| TI002 | Threat_2 | <criteria> | <ALLOW> |
| TI003 | Threat_3 | <criteria> | <BLOCK> |
| TI004 | Threat_4 | <criteria> | <ALLOW> |
| TI005 | Threat_5 | <criteria> | <ALLOW> |
| TI006 | Threat_6 | <criteria> | <ALLOW> |
| TI007 | Threat_7 | <criteria> | <ALLOW> |
| TI008 | Threat_8 | <criteria> | <ALLOW> |
| TI009 | Threat_9 | <criteria> | <ALLOW> |
| ... | ... | ... | ... |
| TI999 | Threat_N | <criteria> | <ALLOW> |

FIG. 4B

Log(s) 220

Packet Log 502

| Time | Packet Info. | Env. Vars. | Threat ID | Disp. |
|---|---|---|---|---|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |

Flow Log 504

| Time Range | Consolidated Info. | Threat ID | Counts |
|---|---|---|---|
| [01, 03] | <info. vars.> | Threat_3 | A=03 B=00 |

Log(s) — 504

Packet Log

| Time | Packet Info. | Env. Vars. | Threat ID | Disp. |
|------|-------------|------------|-----------|-------|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |
| 21 | <info.> | <vars.> | Threat_1 | A |
| 22 | <info.> | <vars.> | Threat_1 | A |
| 23 | <info.> | <vars.> | Threat_1 | A |

502 / 220

Flow Log

| Time Range | Consolidated Info. | Threat ID | Counts |
|------------|-------------------|-----------|--------|
| [01, 03] | <info. vars.> | Threat_3 | A=03 B=00 |
| [08, 14] | <info. vars.> | Threat_5 | A=04 B=00 |

Log(s) 504

Packet Log

| Time | Packet Info. | Env. Vars. | Threat ID | Disp. |
|---|---|---|---|---|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_1 | A |
| 21 | <info.> | <vars.> | Threat_1 | A |
| 22 | <info.> | <vars.> | Threat_1 | A |
| 23 | <info.> | <vars.> | Threat_3 | B |
| 26 | <info.> | <vars.> | Threat_3 | B |
| 27 | <info.> | <vars.> | Threat_3 | B |
| 28 | <info.> | <vars.> | Threat_3 | B |

Flow Log

| Time Range | Consolidated Info. | Threat ID | Counts |
|---|---|---|---|
| [01, 03] | <info. vars.> | Threat_3 | A=03 B=00 |
| [08, 14] | <info. vars.> | Threat_5 | A=04 B=00 |
| [21, 23] | <info. vars.> | Threat_1 | A=03 B=00 |

Log(s) — 504

Packet Log | Flow Log

| Time | Packet Info. | Env. Vars. | Threat ID | Disp. | Time Range | Consolidated Info. | Threat ID | Counts |
|---|---|---|---|---|---|---|---|---|
| 01 | <info.> | <vars.> | Threat_3 | A | [01, 28] | <info. vars.> | Threat_3 | A=03 B=03 |
| 02 | <info.> | <vars.> | Threat_3 | A | [08, 14] | <info. vars.> | Threat_5 | A=04 B=00 |
| 03 | <info.> | <vars.> | Threat_3 | A | [21, 23] | <info. vars.> | Threat_1 | A=03 B=00 |
| 08 | <info.> | <vars.> | Threat_5 | A | | | | |
| 10 | <info.> | <vars.> | Threat_5 | A | | | | |
| 12 | <info.> | <vars.> | Threat_5 | A | | | | |
| 14 | <info.> | <vars.> | Threat_5 | A | | | | |
| 21 | <info.> | <vars.> | Threat_1 | A | | | | |
| 22 | <info.> | <vars.> | Threat_1 | A | | | | |
| 23 | <info.> | <vars.> | Threat_1 | A | | | | |
| 26 | <info.> | <vars.> | Threat_3 | B | | | | |
| 27 | <info.> | <vars.> | Threat_3 | B | | | | |
| 28 | <info.> | <vars.> | Threat_3 | B | | | | |
| 82 | <info.> | <vars.> | Threat_3 | B | | | | |
| 83 | <info.> | <vars.> | Threat_3 | B | | | | |
| 84 | <info.> | <vars.> | Threat_3 | B | | | | |

502 — 220

RULE-BASED NETWORK-THREAT DETECTION

CROSS-REFERENCE TO RELATED APPLICATIONS

This application is a continuation of co-pending U.S. patent application Ser. No. 16/217,720, filed Dec. 12, 2018, which is a continuation of U.S. patent application Ser. No. 15/827,477 (now U.S. Pat. No. 10,193,917), filed Nov. 30, 2017, which is a continuation of U.S. patent application Ser. No. 14/690,302 (now U.S. Pat. No. 9,866,576), filed Apr. 17, 2015, the contents of which are hereby incorporated by reference into the present application.

BACKGROUND

Network security is becoming increasingly important as the information age continues to unfold. Network threats may take a variety of forms (e.g., unauthorized requests or data transfers, viruses, malware, large volumes of network traffic designed to overwhelm network resources, and the like). Many organizations subscribe to network-threat services that periodically provide information associated with network threats, for example, reports that include listings of network-threat indicators (e.g., network addresses, uniform resources identifiers (URIs), and the like). The information provided by such services may be utilized by organizations to identify network threats. For example, logs generated by the organization's network devices may be reviewed for data corresponding to the network-threat indicators provided by such services. But because the logs are generated based on the traffic processed by the network devices without regard to the network-threat indicators, this process is often tedious and time consuming and is exacerbated by the continuously evolving nature of potential threats. Accordingly, there is a need for rule-based network-threat detection.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to rule-based network-threat detection. In accordance with embodiments of the disclosure, a packet-filtering device may receive packet-filtering rules configured to cause the packet-filtering device to identify packets corresponding to network-threat indicators. The packet-filtering device may receive packets and, for each packet, may determine that the packet corresponds to criteria specified by a packet-filtering rule. The criteria may correspond to one or more of the network-threat indicators. The packet-filtering device may apply an operator specified by the packet-filtering rule. The operator may be configured to cause the packet-filtering device to either prevent the packet from continuing toward its destination or allow the packet to continue toward its destination. The packet-filtering device may generate a log entry comprising information from the packet-filtering rule that identifies the one or more network-threat indicators and indicating whether the packet-filtering device prevented the packet from continuing toward its destination or allowed the packet to continue toward its destination.

In some embodiments, the packet-filtering device may generate and communicate to a user device data indicating whether the packet-filtering device prevented the packet from continuing toward its destination or allowed the packet to continue toward its destination. The user device may receive the data and indicate in an interface displayed by the user device whether the packet-filtering device prevented the packet from continuing toward its destination or allowed the packet to continue toward its destination. The interface may comprise an element that when invoked by a user of the user device causes the user device to instruct the packet-filtering device to reconfigure the operator to prevent future packets corresponding to the criteria from continuing toward their respective destinations.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 4A, 4B, and 4C depict illustrative packet-filtering rules for rule-based network-threat detection in accordance with one or more aspects of the disclosure;

FIGS. 5A, 5B, 5C, 5D, 5E, 5F, and 5G depict illustrative logs for rule-based network-threat detection in accordance with one or more aspects of the disclosure;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure.

Various connections between elements are discussed in the following description. These connections are general and, unless specified otherwise, may be direct or indirect, wired or wireless. In this respect, the specification is not intended to be limiting.

Figure 1:
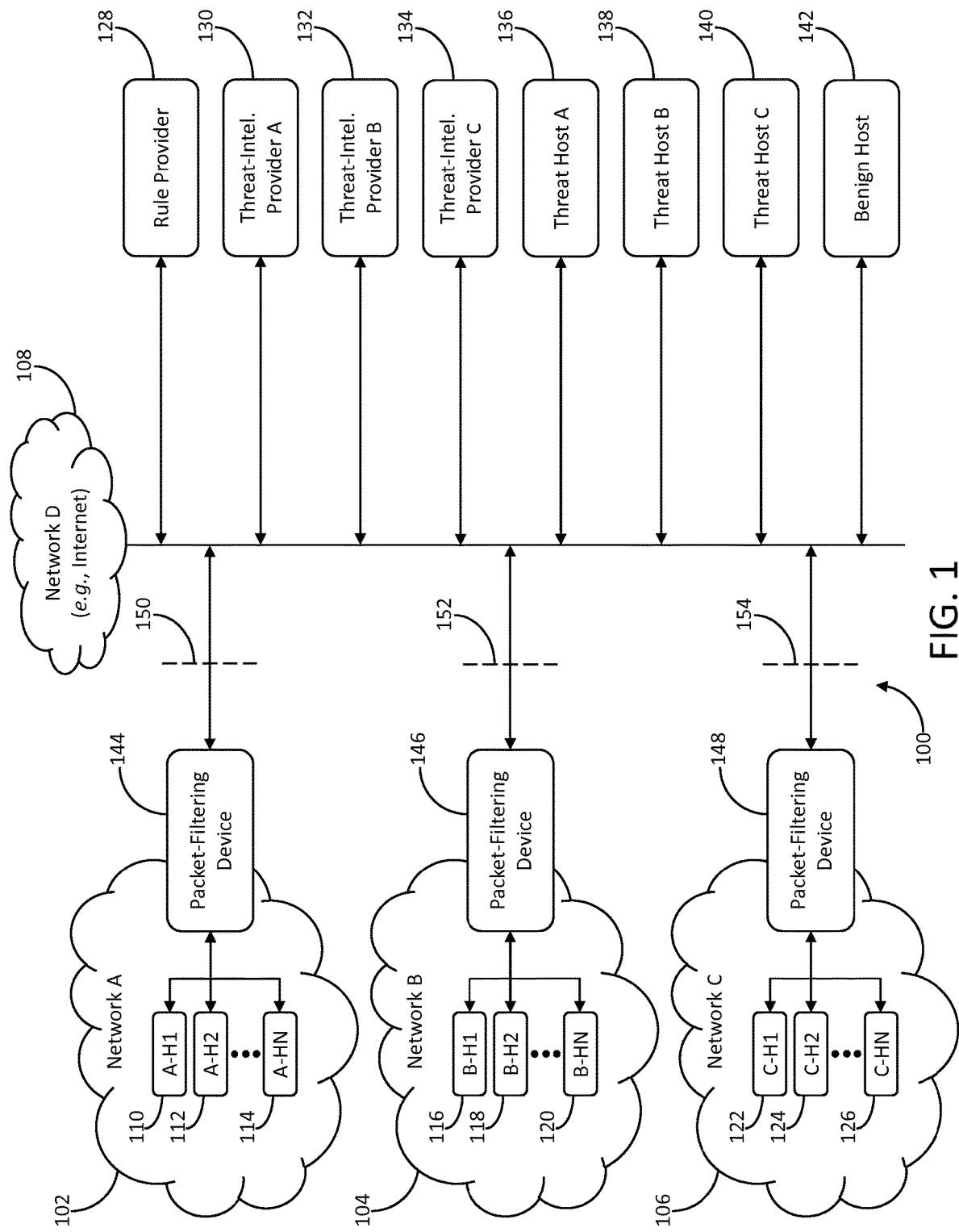
FIG. 1 depicts an illustrative environment for rule-based network-threat detection in accordance with one or more aspects of the disclosure.

FIG. 1 depicts an illustrative environment for rule-based network-threat detection in accordance with one or more aspects of the disclosure. Referring to FIG. 1, environment 100 may include one or more networks. For example, environment 100 may include networks 102, 104, 106, and 108. Networks 102, 104, and 106 may comprise one or more networks (e.g., Local Area Networks (LANs), Wide Area Networks (WANs), Virtual Private Networks (VPNs), or combinations thereof) associated with one or more individuals or entities (e.g., governments, corporations, service providers, or other organizations). Network 108 may comprise one or more networks (e.g., LANs, WANs, VPNs, or combinations thereof) that interface networks 102, 104, and 106 with each other and one or more other networks (not illustrated). For example, network 108 may comprise the Internet, a similar network, or portions thereof.

Environment 100 may also include one or more hosts, such as computing or network devices (e.g., servers, desktop computers, laptop computers, tablet computers, mobile devices, smartphones, routers, gateways, switches, access points, or the like). For example, network 102 may include hosts 110, 112, and 114, network 104 may include hosts 116, 118, and 120, network 106 may include hosts 122, 124, and 126, and network 108 may interface networks 102, 104, and 106 with one or more hosts associated with rule provider 128 or network-threat-intelligence providers 130, 132, and 134, threat hosts 136, 138, and 140, and benign host 142. Network-threat-intelligence providers 130, 132, and 134 may be associated with services that monitor network threats (e.g., threats associated with threat hosts 136, 138, and 140) and disseminate (e.g., to subscribers) network-threat-intelligence reports that include network-threat indicators (e.g., network addresses, ports, fully qualified domain names (FQDNs), uniform resource locators (URLs), uniform resource identifiers (URIs), or the like) associated with the network threats, as well as other information associated with the network threats, for example, the type of threat (e.g., phishing malware, botnet malware, or the like), geographic information (e.g., International Traffic in Arms Regulations (ITAR) country, Office of Foreign Assets Control (OFAC) country, or the like), anonymous proxies (e.g., Tor network, or the like), actors (e.g., the Russian Business Network (RBN), or the like).

Environment 100 may further include packet-filtering devices 144, 146, and 148. Packet-filtering device 144 may be located at boundary 150 between networks 102 and 108. Similarly, packet-filtering device 146 may be located at boundary 152 between networks 104 and 108, and packet-filtering device 148 may be located at boundary 154 between networks 106 and 108.

Figure 2A:
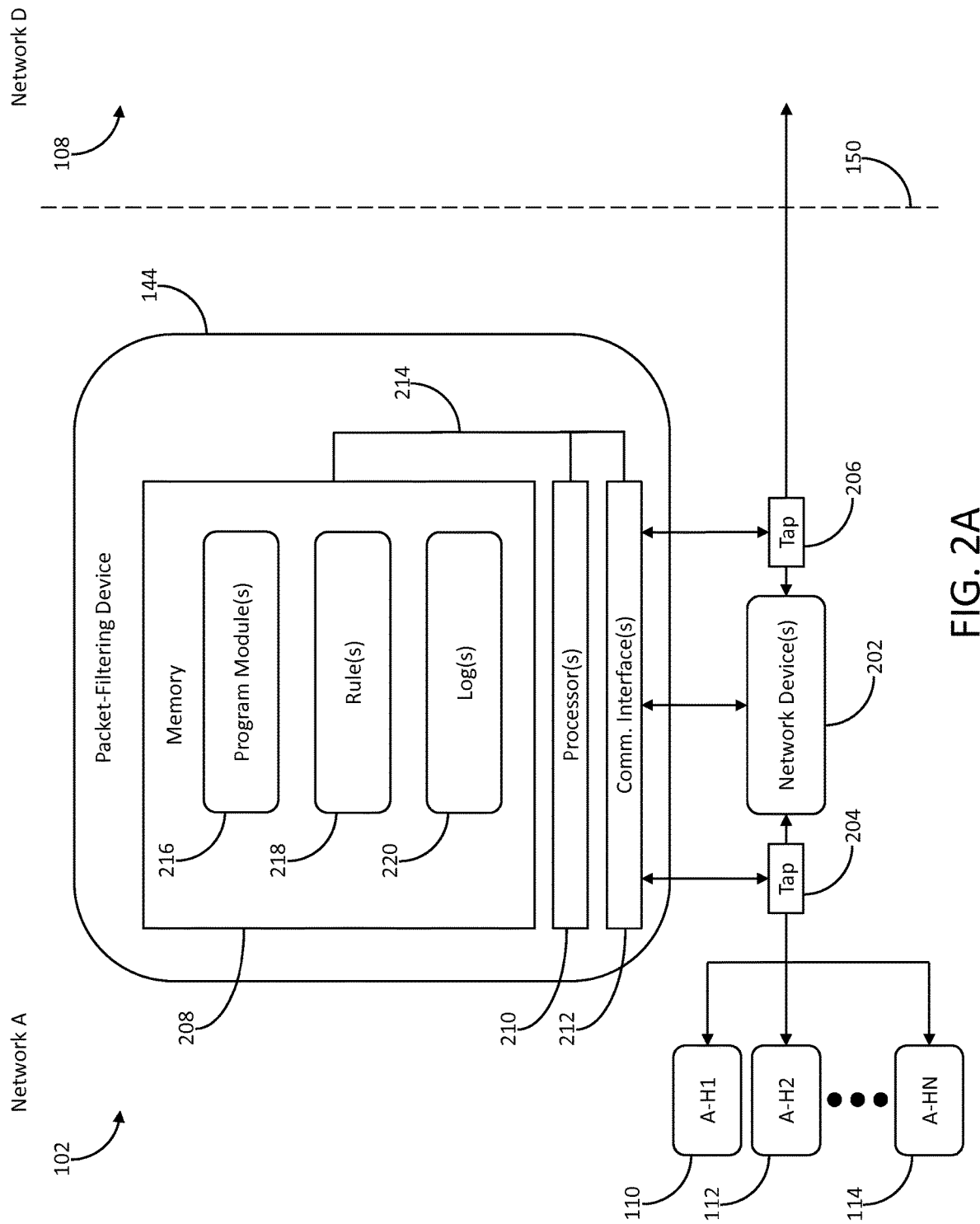
FIGS. 2A and 2B depict illustrative devices for rule-based network-threat detection in accordance with one or more aspects of the disclosure.
Figure 2B:
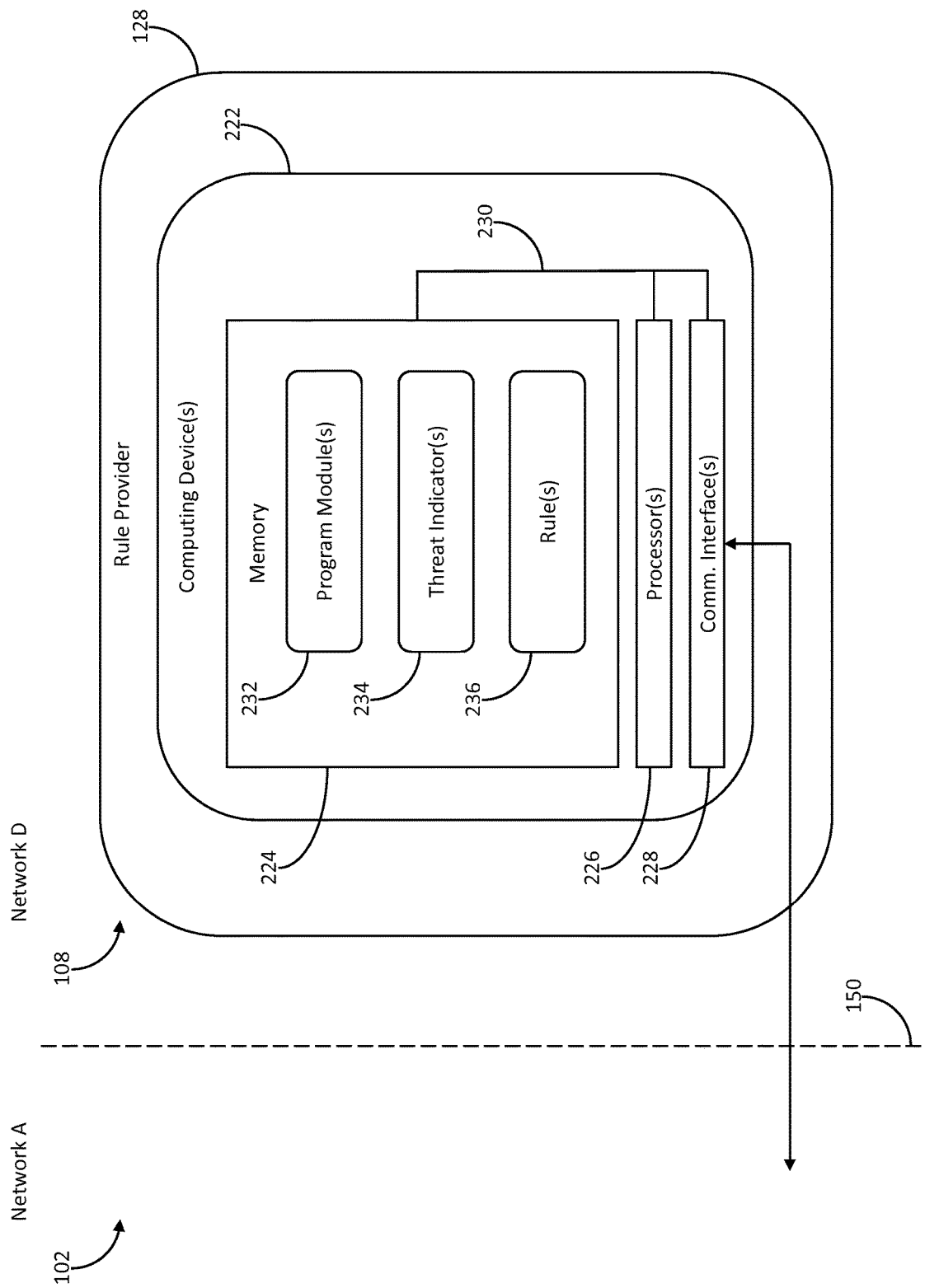

FIGS. 2A and 2B depict illustrative devices for rule-based network-threat detection in accordance with one or more aspects of the disclosure.

Referring to FIG. 2A, as indicated above, packet-filtering device 144 may be located at boundary 150 between networks 102 and 108. Network 102 may include one or more network devices 202 (e.g., servers, routers, gateways, switches, access points, or the like) that interface hosts 110, 112, and 114 with network 108. Network 102 may also include tap devices 204 and 206. Tap device 204 may be located on or have access to a communication path that interfaces network devices 202 and network 102 (e.g., one or more of hosts 110, 112, and 114). Tap device 206 may be located on or have access to a communication path that interfaces network devices 202 and network 108. Packet-filtering device 144 may include memory 208, one or more processors 210, one or more communication interfaces 212, and data bus 214. Data bus 214 may interface memory 208, processors 210, and communication interfaces 212. Communication interfaces 212 may interface packet-filtering device 144 with network devices 202 and tap devices 204 and 206. Memory 208 may comprise one or more program modules 216, one or more packet-filtering rules 218, and one or more logs 220. Program modules 216 may comprise instructions that when executed by processors 210 cause packet-filtering device 144 to perform one or more of the functions described herein. Networks 104 and 106 may each comprise components similar to those described herein with respect to network 102, and packet-filtering devices 146 and 148 may each comprise components similar to those described herein with respect to packet-filtering device 144.

Referring to FIG. 2B, rule provider 128 may include one or more computing devices 222. Computing devices 222 may include memory 224, one or more processors 226, one or more communication interfaces 228, and data bus 230. Data bus 230 may interface memory 224, processors 226, and communication interfaces 228. Communication interfaces 228 may interface computing devices 222 with network 108, which, as indicated above, may interface with network 102 at boundary 150. Memory 224 may comprise one or more program modules 232, one or more network-threat indicators 234, and one or more packet-filtering rules 236. Program modules 232 may comprise instructions that when executed by processors 226 cause computing devices 222 to perform one or more of the functions described herein.

FIGS. 3A, 3B, 3C, 3D, 3E, and 3F depict an illustrative event sequence for rule-based network-threat detection in accordance with one or more aspects of the disclosure. In reviewing the illustrative event sequence, it will be appreciated that the number, order, and timing of the illustrative events is simplified for the purpose of illustration and that additional (unillustrated) events may occur, the order and time of events may differ from the depicted illustrative events, and some events or steps may be omitted, combined, or occur in an order other than that depicted by the illustrative event sequence.

Figure 3A:
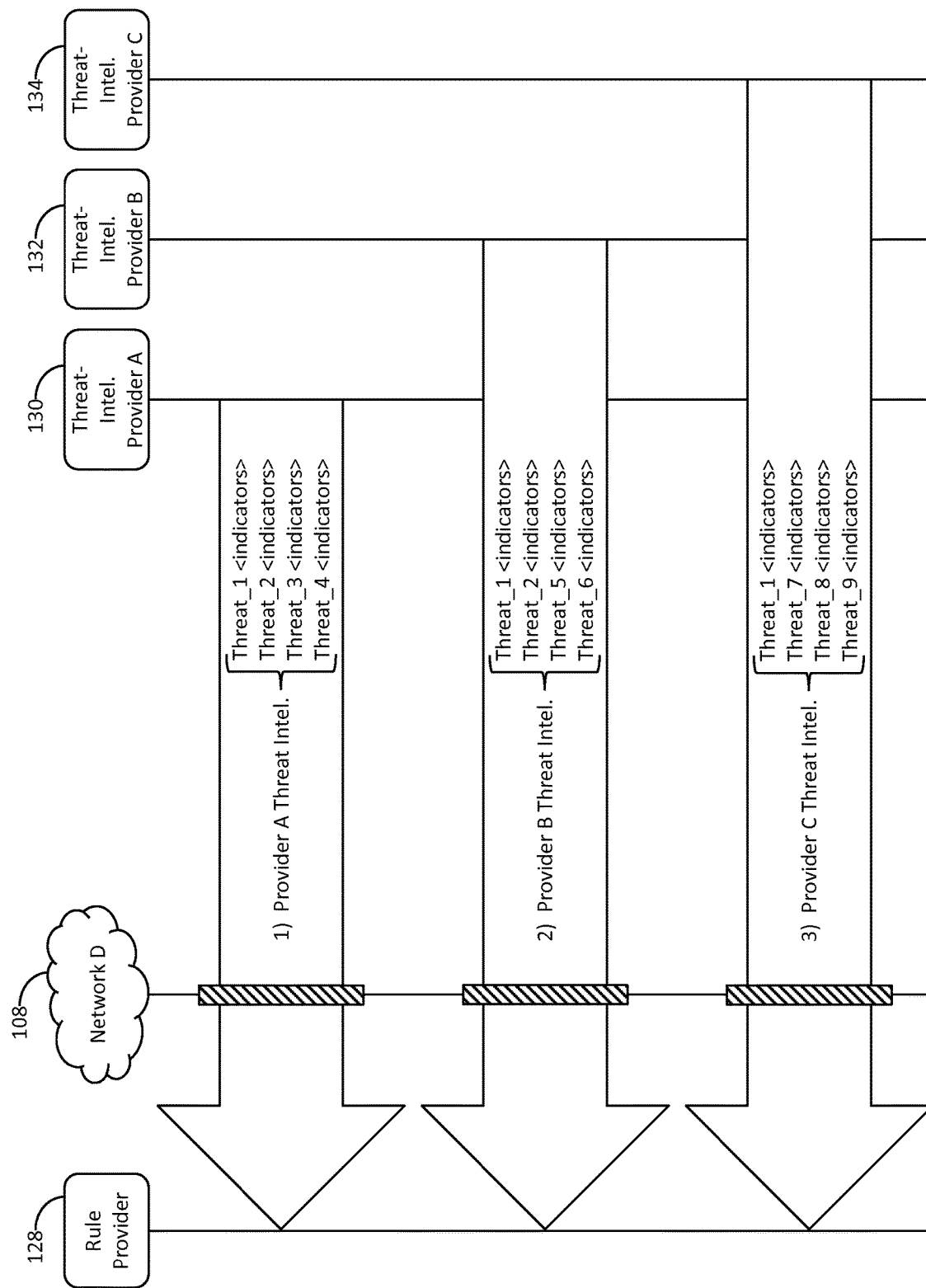
FIGS. 3A, 3B, 3C, 3D, 3E, and 3F depict an illustrative event sequence for rule-based network-threat detection in accordance with one or more aspects of the disclosure.

Referring to FIG. 3A, at step 1, network-threat-intelligence provider 130 may communicate to rule provider 128 (e.g., via network 108, as designated by the shaded box over the line extending downward from network 108) one or more network-threat-intelligence reports identifying one or more network threats (e.g., Threat_1, Threat_2, Threat_3, and Threat_4) and comprising one or more associated network-threat indicators (e.g., network addresses, ports, FQDNs, URLs, URIs, or the like), as well as other information associated with the network threats (e.g., the type of threat, geographic information, anonymous proxies, actors, or the like). Similarly, at step 2, network-threat-intelligence provider 132 may communicate to rule provider 128 one or more network-threat-intelligence reports identifying one or more network threats (e.g., Threat_1, Threat_2, Threat_5, and Threat_6) and comprising one or more associated network-threat indicators, as well as other information associated with the network threats, and, at step 3, network-threat-intelligence provider 134 may communicate to rule provider 128 one or more network-threat-intelligence reports identifying one or more network threats (e.g., Threat_1, Threat_7, Threat_8, and Threat_9) and comprising one or more associated network-threat indicators, as well as other information associated with the network threats. Rule provider 128 (e.g., computing devices 222) may receive (e.g., via communication interfaces 228) the network-threat-intelligence reports communicated by network-threat-intelligence providers 130, 132, and 134, and may store data contained therein in memory 224 (e.g., network-threat indicators 234).

Figure 3B:
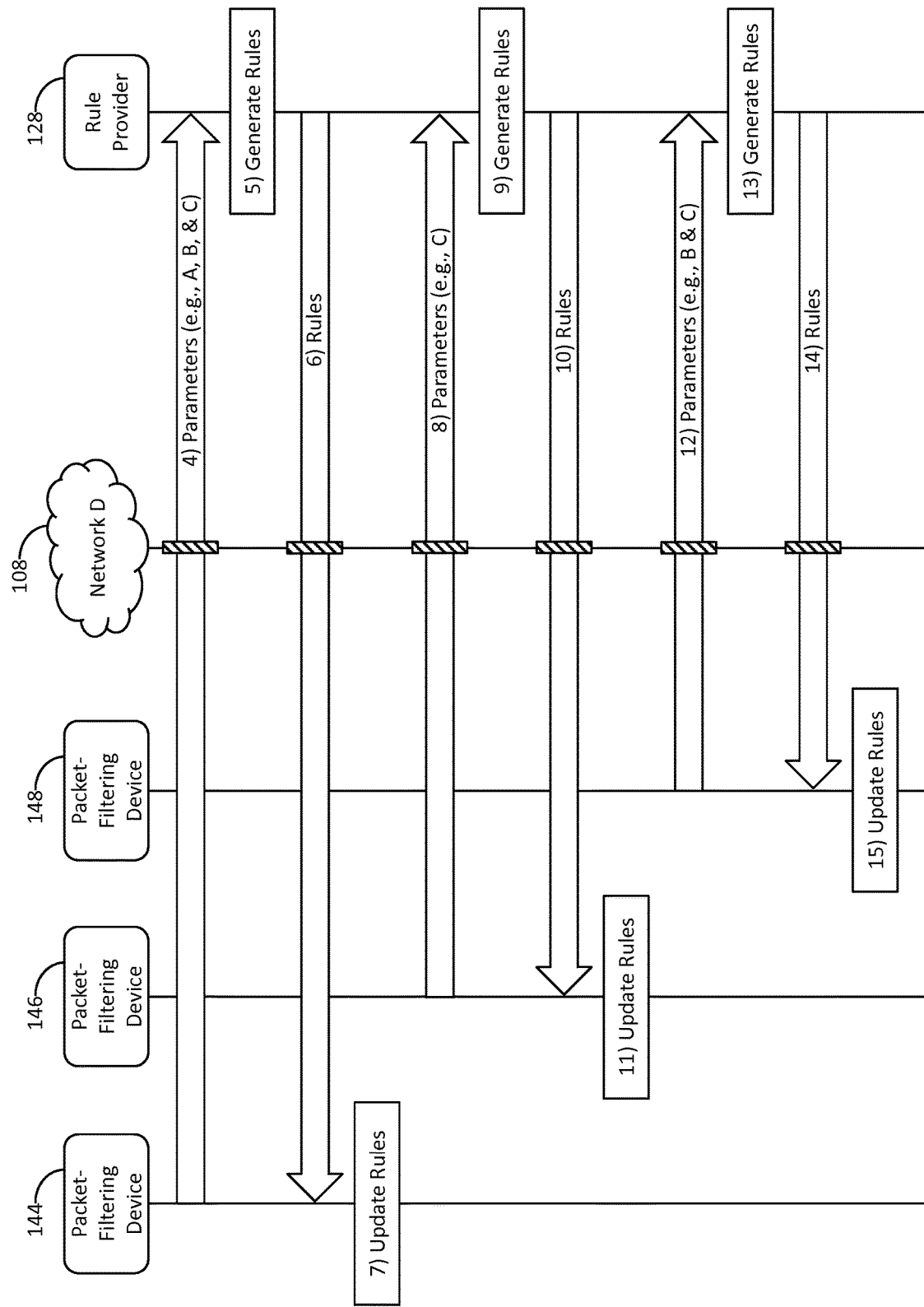

Referring to FIG. 3B, at step 4, packet-filtering device 144 may communicate one or more parameters to rule provider 128 (e.g., parameters indicating a preference, authorization, subscription, or the like to receive packet-filtering rules generated based on network-threat-intelligence reports provided by network-threat-intelligence providers 130, 132, and 134). At step 5, rule provider 128 (e.g., computing devices 222) may generate one or more packet-filtering rules (e.g., packet-filtering rules 236) based on the network-threat-intelligence reports provided by network-threat-intelligence providers 130, 132, and 134 (e.g., network-threat indicators 234) and, at step 6, may communicate the packet-filtering rules to packet-filtering device 144, which, at step 7, may update packet-filtering rules 218 to include the packet-filtering rules generated by rule provider 128 in step 5.

Figure 4C:
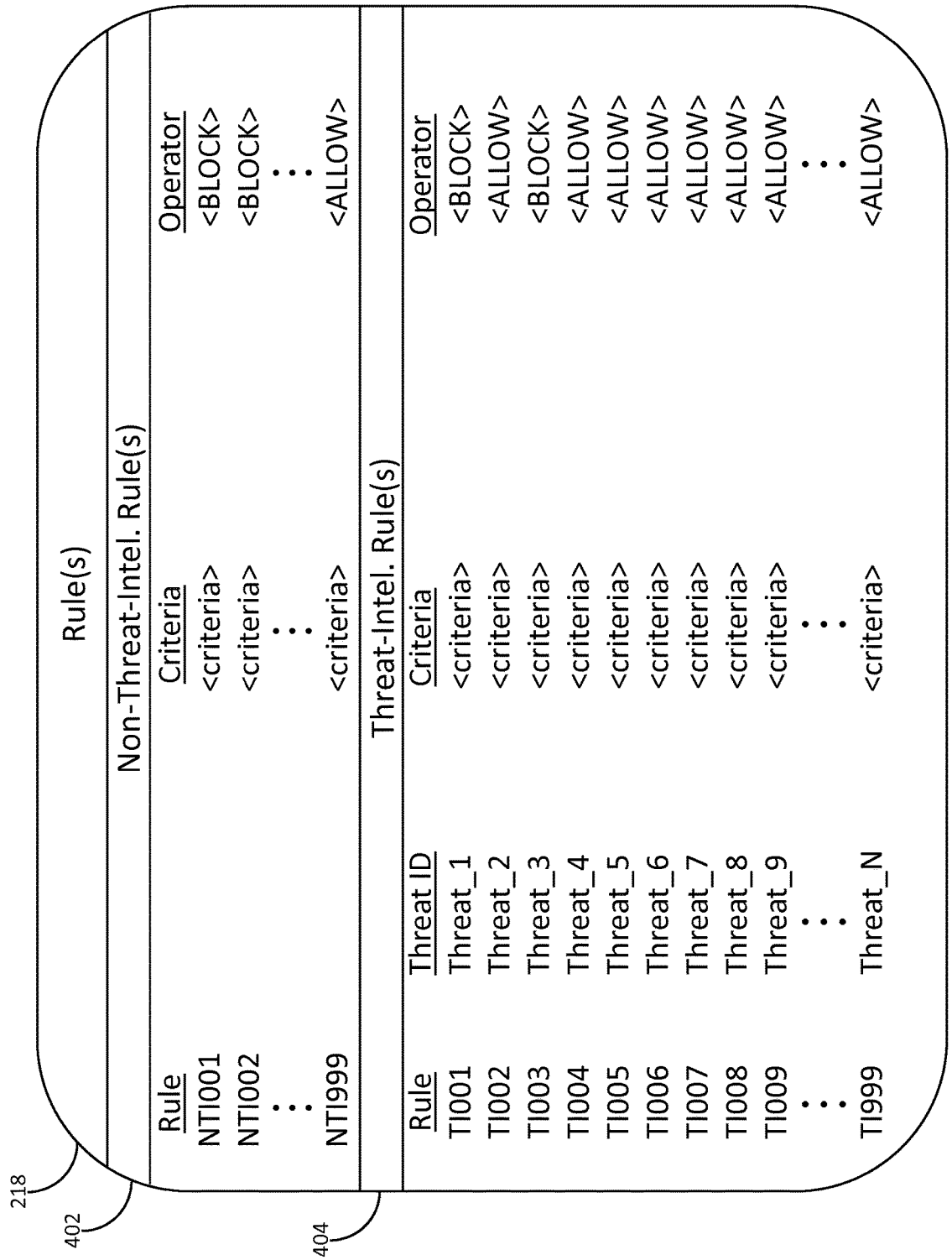

For example, referring to FIG. 4A, packet-filtering rules 218 may include packet-filtering rules 402 that comprise non-network-threat-intelligence rules (e.g., packet-filtering rules generated by an administrator of network 102) and packet-filtering rules 404 that comprise network-threat-intelligence rules (e.g., the packet-filtering rules communicated by rule provider 128 in step 6). Each of the network-threat-intelligence rules may comprise: one or more criteria that correspond to one or more of network-threat indicators 234 upon which the rule is based and may be configured to cause packet-filtering device 144 to identify packets corresponding to the criteria (e.g., corresponding to the network-threat indicators upon which the rule is based); an operator configured to cause packet-filtering device 144 to either prevent packets corresponding to the criteria from continuing toward their respective destinations (e.g., a BLOCK operator) or allow packets corresponding to the criteria to continue toward their respective destinations (e.g., an ALLOW operator); and information distinct from the criteria (e.g., a Threat ID) that identifies one or more of the network-threat indicators upon which the rule is based, one or more network threats associated with the network-threat indicators, one or more network-threat-intelligence reports that included the network-threat indicators, one or more of network-threat-intelligence providers 130, 132, or 134 that provided the network-threat-intelligence reports, or other information contained in the network-threat-intelligence reports that is associated with the network-threat indicators or the network threats (e.g., the type of threat, geographic information, anonymous proxies, actors, or the like).

Returning to FIG. 3B, at step 8, packet-filtering device 146 may communicate one or more parameters to rule provider 128 (e.g., parameters indicating a preference, authorization, subscription, or the like to receive packet-filtering rules generated based on network-threat-intelligence reports provided by network-threat-intelligence provider 134). At step 9, rule provider 128 may generate one or more packet-filtering rules based on the network-threat-intelligence reports provided by network-threat-intelligence provider 134 (e.g., network-threat indicators 234 (or a portion thereof included in network-threat-intelligence reports received from network-threat-intelligence provider 134)) and, at step 10, may communicate the packet-filtering rules to packet-filtering device 146, which, at step 11, may update its packet-filtering rules to include the packet-filtering rules generated by rule provider 128 in step 9. Similarly, at step 12, packet-filtering device 148 may communicate one or more parameters to rule provider 128 (e.g., parameters indicating a preference, authorization, subscription, or the like to receive packet-filtering rules generated based on network-threat-intelligence reports provided by network-threat-intelligence providers 132 and 134). At step 13, rule provider 128 may generate one or more packet-filtering rules based on the network-threat-intelligence reports provided by network-threat-intelligence providers 132 and 134 (e.g., network-threat indicators 234 (or a portion thereof included in network-threat-intelligence reports received from network-threat-intelligence providers 132 and 134)) and, at step 14, may communicate the packet-filtering rules to packet-filtering device 148, which, at step 15, may update its packet-filtering rules to include the packet-filtering rules generated by rule provider 128 in step 13.

Figure 3C:
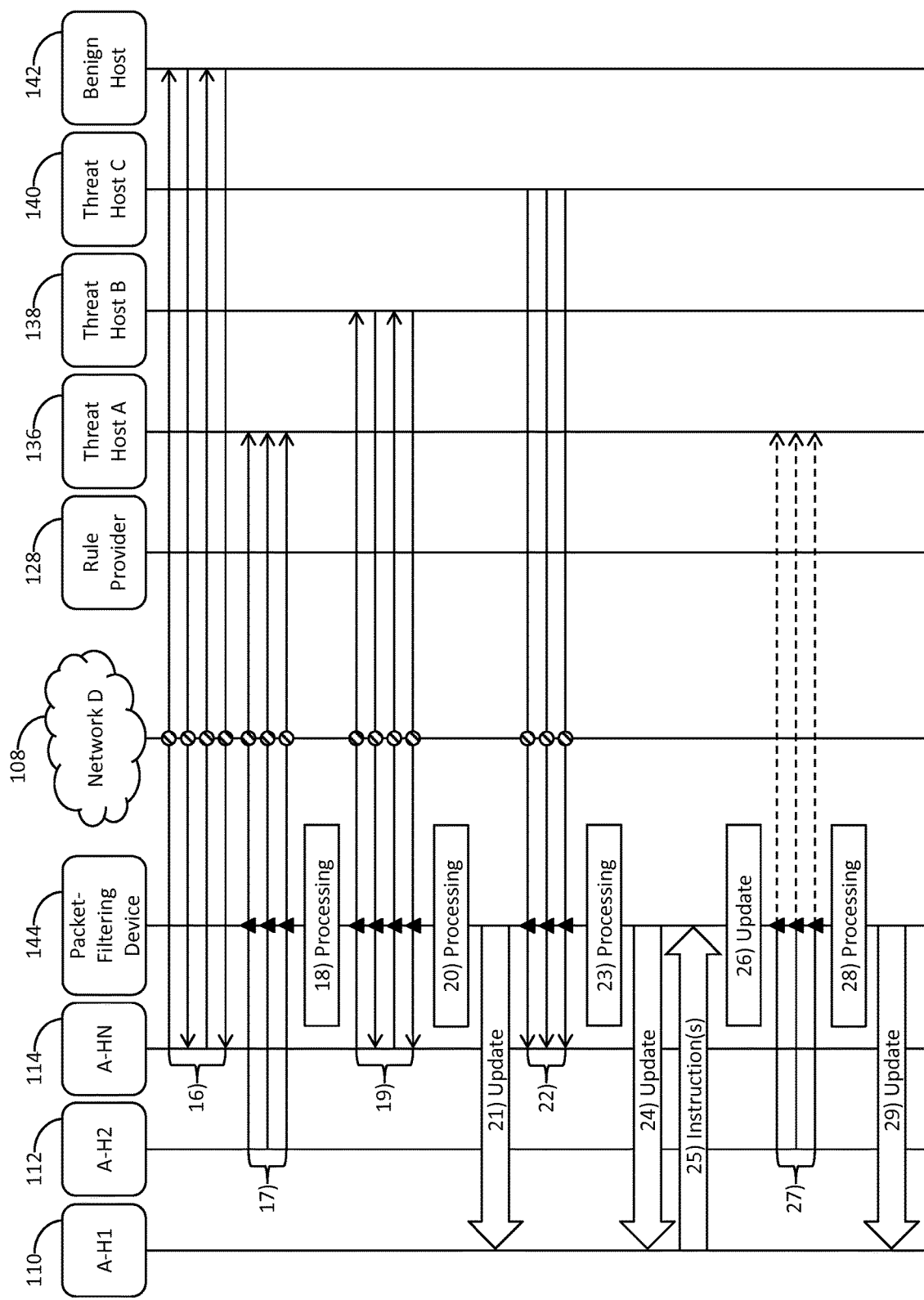

Referring to FIG. 3C, at step 16, four packets may be communicated (e.g., via network 108, as designated by the shaded circles over the line extending downward from network 108) between host 114 and benign host 142 (e.g., two packets originating from host 114 and destined for benign host 142 and two packets originating from benign host 142 and destined for host 114), and packet-filtering device 144 may receive each of the four packets (e.g., via tap devices 204 and 206), apply one or more of packet-filtering rules 218 to the four packets, and allow the four packets to continue toward their respective destinations.

At step 17, three packets may be communicated by host 112 to threat host 136, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., an ALLOW operator) to each of the three packets, allow each of the three packets to continue toward its respective destination (e.g., toward threat host 136), and generate log data for each of the three packets (as designated by the triangles over the line extending downward from packet-filtering device 144).

Figure 5A:
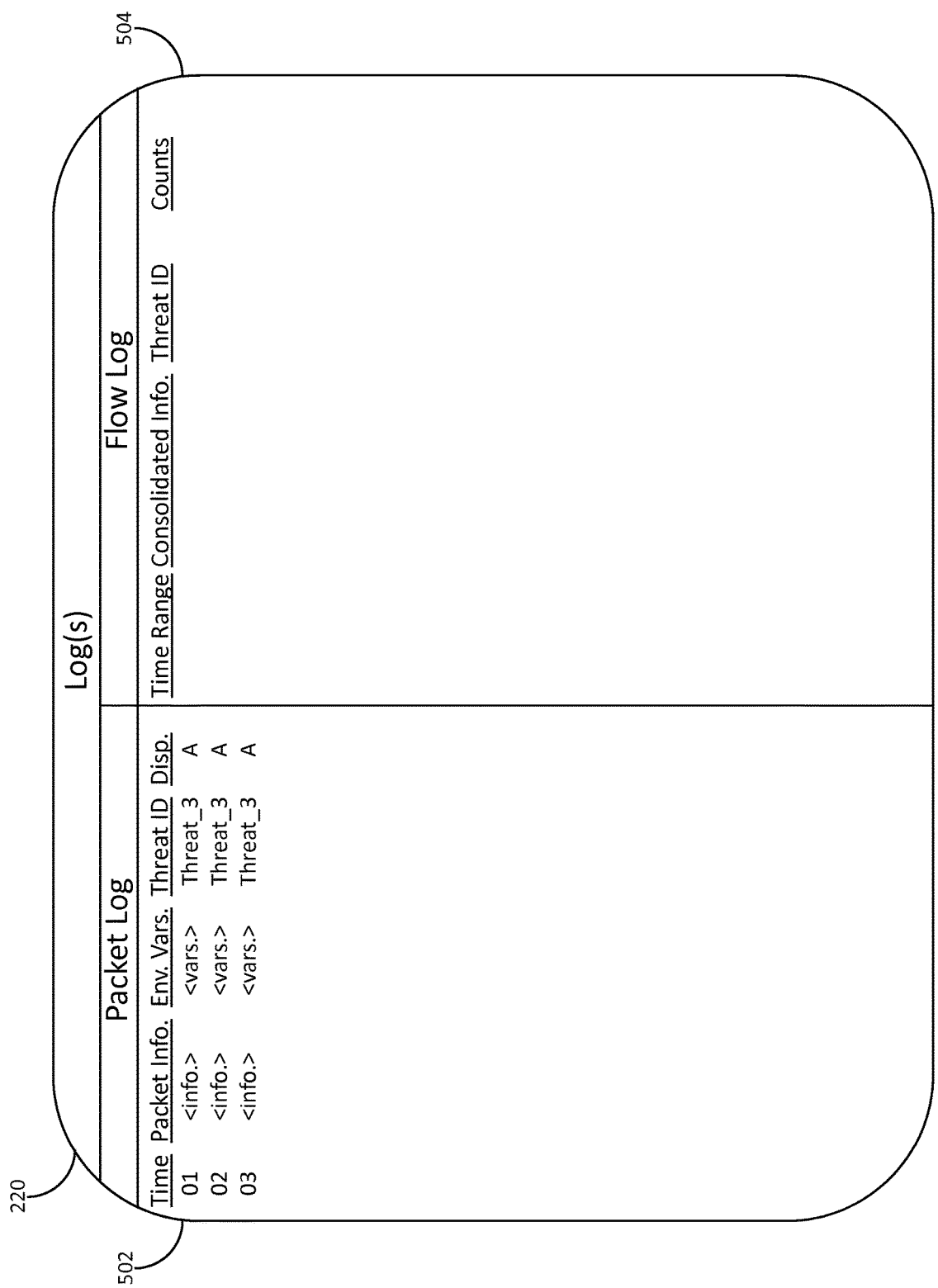

At step 18, packet-filtering device 144 may begin processing the log data generated in step 17. For example, referring to FIG. 5A, logs 220 may include packet log 502 and flow log 504, each of which (or portions thereof) may be reserved or distinguished for entries associated with packets corresponding to criteria included in packet-filtering rules 404, and packet-filtering device 144 may generate an entry in packet log 502 for each of the three packets. Each entry may comprise data indicating a hit time for the packet (e.g., a time at which the packet was received by packet-filtering device 144, identified by packet-filtering device 144, or the like), data derived from the packet (e.g., a source address, a destination address, a port number, a protocol type, a domain name, URL, URI, or the like), one or more environmental variables (e.g., an identifier of an interface of packet-filtering device 144 over which the packet was received, an identifier of an interface of packet-filtering device 144 over which the packet was forwarded toward its destination, an identifier associated with packet-filtering device 144 (e.g., distinguishing packet-filtering device 144 from packet-filtering devices 146 and 148), or the like), data identifying the packet-filtering rule of packet-filtering rules 404 to which the packet corresponded (e.g., Thread ID: Threat_3), and data indicating whether packet-filtering device 144 prevented the packet from continuing toward its destination or allowed the packet to continue toward its destination (e.g., the character A may designate that packet-filtering device 144 allowed the packet to continue toward its destination, and the character B may designate that packet-filtering device 144 prevented the packet from continuing toward its destination).

Returning to FIG. 3C, at step 19, four packets may be communicated between host 114 and threat host 138 (e.g., two packets originating from host 114 and destined for threat host 138 and two packets originating from threat host 138 and destined for host 114), and packet-filtering device 144 may receive each of the four packets, apply one or more of packet-filtering rules 218 to the four packets, determine that each of the four packets corresponds to criteria specified by a packet-filtering rule of packet-filtering rules 404 (e.g., Rule: TI005), apply an operator specified by the packet-filtering rule (e.g., an ALLOW operator) to each of the four packets, allow each of the four packets to continue toward its respective destination, and generate log data for each of the four packets. In some embodiments, the criteria specified by one or more of packet-filtering rules 404 (e.g., the criteria generated from the network-threat indicators) may include network addresses and one or more of the packets received by packet-filtering device 144 may comprise domain names, URIs, or URLs. In such embodiments, packet-filtering device 144 may comprise a local domain name system (DNS) cache (e.g., stored in memory 208) and may utilize the local DNS cache to resolve one or more of the domain names, URIs, or URLs included in the packets into one or more of the network addresses included in the criteria.

At step 20, packet-filtering device 144 may continue processing the log data generated in step 17 and may begin processing the log data generated in step 19. In some embodiments, packet-filtering device 144 may be configured in accordance with work-conserving scheduling in order to minimize latency (e.g., the time between when a packet corresponding to a network threat crosses boundary 150 and the time when an administrator associated with network 102 is presented with an interface indicating that the packet corresponding to the network threat has crossed boundary 150). For example, referring to FIG. 5B, packet-filtering device 144 may generate entries in packet log 502 for each of the packets received in step 19 while generating an entry in flow log 504 for the packets received in step 17. Packet-filtering device 144 may generate the entry in flow log 504 for the packets received in step 17 based on the entries generated in packet log 502 (e.g., in step 18) for the packets received in step 17. The entry in flow log 504 may consolidate, compress, or summarize the entries in packet log 502. For example, the entry in flow log 504 may comprise a time range (e.g., [01, 03]) indicating the earliest hit time indicated by the entries (e.g., Time: 01) to the latest hit time indicated by the entries (e.g., Time: 03), consolidated information from the entries (e.g., a consolidation of the information derived from the packets and the environmental variables), information that each of the associated packets have in common (e.g., Threat ID: Threat_3), a count of the associated packets allowed by packet-filtering device 144 to continue toward their respective destinations, and a count of the associated packets prevented by packet-filtering device 144 from continuing toward their respective destinations.

Returning to FIG. 3C, at step 21, packet-filtering device 144 may utilize flow log 504 to generate data comprising an update for an interface associated with packet-filtering device 144 and displayed by host 110, and may communicate the data comprising the update to host 110. For example, referring to FIG. 6A, host 110 may be a user device associated with an administrator of network 102 and configured to display interface 600. Interface 600 may include graphical depictions 602 and 604, which may illustrate activity associated with packet-filtering device 144. For example, graphical depiction 602 may comprise a line chart depicting, for a user-specified time interval, a number of packet hits, a number of packets prevented from continuing toward their respective destinations, a number of packets allowed to continue toward their respective destinations, or the like, and graphical depiction 604 may comprise an annulated pie chart illustrating percentages of hits during the user-specified time interval that are associated with various category types (e.g., type of network threat, geographic information, anonymous proxies, actors, or the like).

Interface 600 may also include listing 606, which may comprise entries corresponding to network threats and, for each threat, associated information derived by packet-filtering device 144 from flow log 504 (e.g., a description of the threat, information derived from the consolidated information stored in flow log 504, the time of the last associated packet hit, a count of associated packet hits, a count of associated packets allowed by packet-filtering device 144 to continue toward their respective destinations, a count of associated packets prevented by packet-filtering device 144 from continuing toward their respective destinations) and a status of the operator included in the rule associated with the threat.

Packet-filtering device 144 may be configured to determine an ordering of the network threats, and listing 606 may be displayed in accordance with the ordering determined by packet-filtering device 144. In some embodiments, packet-filtering device 144 may be configured to determine a score for each of the network threats and the ordering may be determined based on the scores. In such embodiments, the scores may be determined based on a number of associated packet hits, times associated with the packet hits (e.g., time of day, time since last hit, or the like), whether the packet was destined for a network address associated with a host in network 102 or a host in network 108, one or more network-threat-intelligence providers that provided the network-threat indicators associated with the threat, the number of network-threat intelligence providers that provided the network-threat indicators associated with the threat, other information associated with the network threat (e.g., type of network threat, geographic information, anonymous proxies, actors, or the like).

Figure 6A:
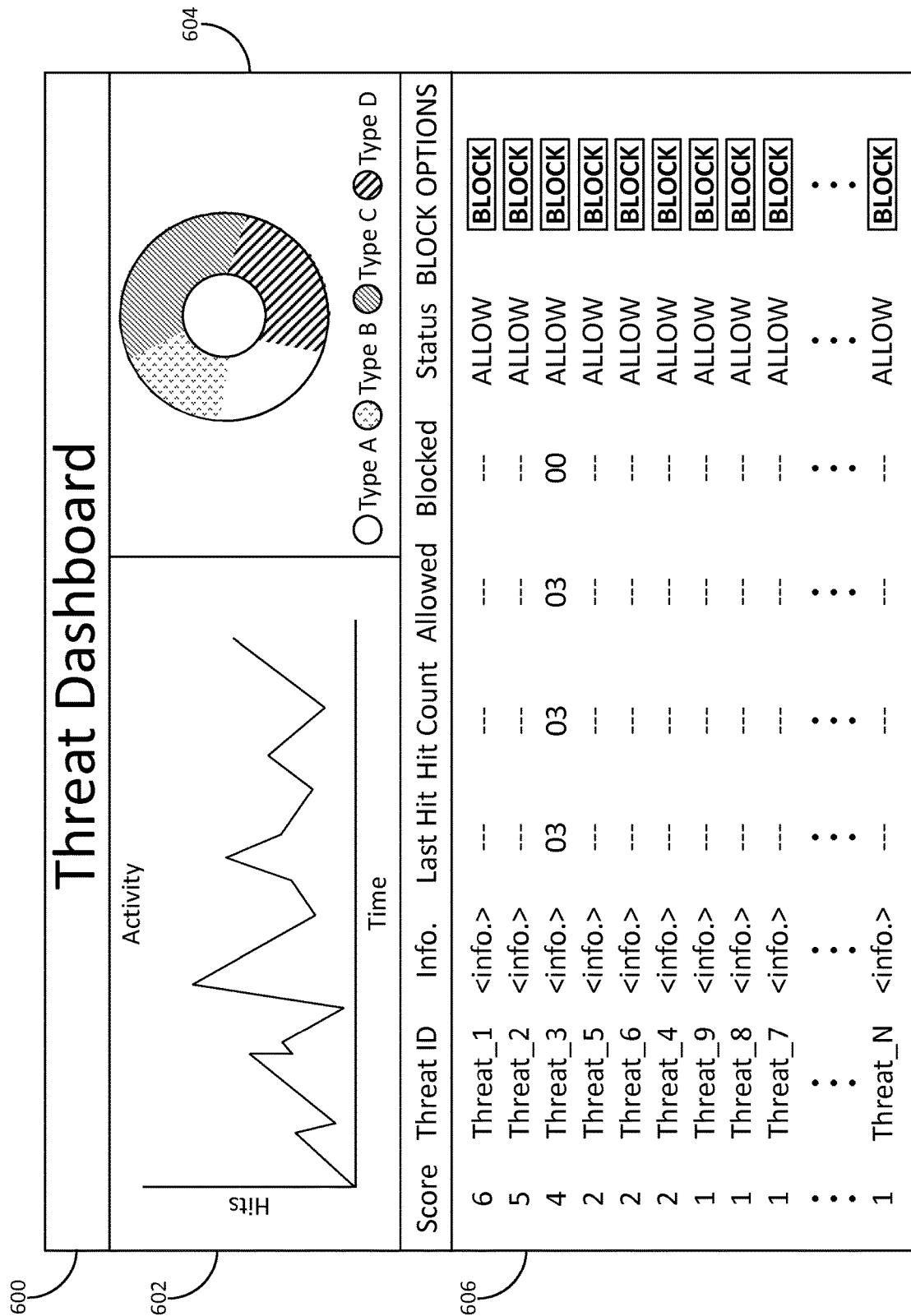
FIGS. 6A, 6B, 6C, 6D, 6E, 6F, and 6G depict illustrative interfaces for rule-based network-threat detection in accordance with one or more aspects of the disclosure.

For example, as illustrated in FIG. 6A, the threat associated with Threat ID: Threat_1 may be assigned a score (e.g., 6) higher than the score assigned to the threat associated with Threat ID: Threat_2 (e.g., 5) based on a determination that the network-threat-indicators corresponding to the threat associated with Threat ID: Threat_1 were received from three different network-threat-intelligence providers (e.g., network-threat-intelligence providers 130, 132, and 134) and a determination that the network-threat-indicators corresponding to the threat associated with Threat ID: Threat_2 were received from two different network-threat-intelligence providers (e.g., network-threat-intelligence providers 130 and 132). Similarly, the threat associated with Threat ID: Threat_2 may be assigned a score (e.g., 5) higher than the score assigned to the threat associated with Threat ID: Threat_3 (e.g., 4) based on a determination that the network-threat-indicators corresponding to the threat associated with Threat ID: Threat_2 were received from two different network-threat-intelligence providers (e.g., network-threat-intelligence providers 130 and 132) and a determination that the network-threat-indicators corresponding to the threat associated with Threat ID: Threat_3 were received from one network-threat-intelligence provider (e.g., network-threat-intelligence provider 130). Additionally, the threat associated with Threat ID: Threat_3 may be assigned a score (e.g., 4) higher than the score assigned to the threat associated with Threat ID: Threat_5 (e.g., 2) based on a determination that the last packet hit corresponding to the threat associated with Threat ID: Threat_3 is more recent than the last packet hit corresponding to the threat associated with Threat ID: Threat_5, and the threat associated with Threat ID: Threat_4 may be assigned a score (e.g., 2) higher than the score assigned to the threat associated with Threat ID: Threat_9 (e.g., 1) based on a determination that the network-threat-indicators corresponding to the threat associated with Threat ID: Threat_4 were received from network-threat-intelligence provider 130 and a determination that the network-threat-indicators corresponding to the threat associated with Threat ID: Threat_9 were received from network-threat-intelligence provider 134 (e.g., the network-threat-intelligence reports produced by network-threat-intelligence provider 130 may be regarded as more reliable than the network-threat-intelligence reports produced by network-threat-intelligence provider 134).

Returning to FIG. 3C, at step 22, three packets may be communicated by threat host 140 to host 114, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI001), apply an operator specified by the packet-filtering rule (e.g., an ALLOW operator) to each of the three packets, allow each of the three packets to continue toward its respective destination (e.g., toward host 114), and generate log data for each of the three packets.

At step 23, packet-filtering device 144 may continue processing the log data generated in step 19 and may begin processing the log data generated in step 22. For example, referring to FIG. 5C, packet-filtering device 144 may generate entries in packet log 502 for each of the packets received in step 22 while generating an entry in flow log 504 for the packets received in step 19 based on the entries generated in packet log 502 (e.g., in step 20) for the packets received in step 19.

Figure 6B:
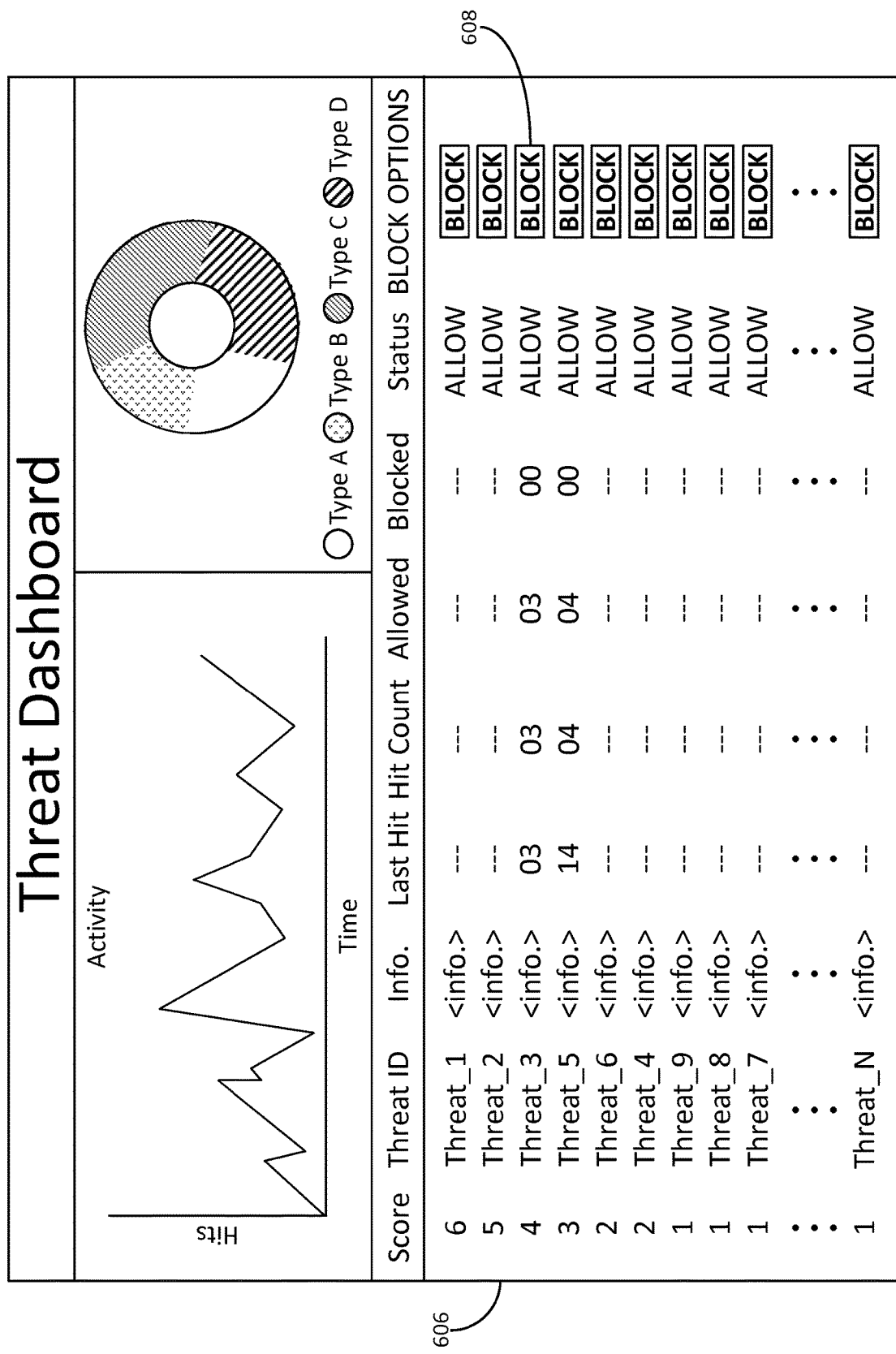

Returning to FIG. 3C, at step 24, packet-filtering device 144 may utilize flow log 504 to generate data comprising an update for interface 600 and may communicate the data to host 110. For example, referring to FIG. 6B, the update may cause interface 600 to update an entry in listing 606 corresponding to the threat associated with Threat ID: Threat_5 to reflect the packets received in step 19 and to reflect a new score (e.g., 3) assigned by packet-filtering device 144 to the threat associated with Threat ID: Threat_5 (e.g., the score may have increased based on the packets received in step 19).

Interface 600 may include one or more block options that when invoked by a user of host 110 (e.g., the administrator of network 102) cause host 110 to instruct packet-filtering device 144 to reconfigure an operator of a packet-filtering rule included in packet-filtering rules 404 to prevent packets corresponding to the criteria specified by the packet-filtering rule from continuing toward their respective destinations. In some embodiments, listing 606 may include such a block option alongside each entry, and, when invoked, the block option may cause host 110 to instruct packet-filtering device 144 to reconfigure an operator of packet-filtering rules 404 that corresponds to the network threat associated with the entry. For example, interface 600 may include block option 608, which, when invoked, may cause host 110 to instruct packet-filtering device 144 to reconfigure an operator associated with Rule: TI003 (e.g., to reconfigure the operator to cause packet-filtering device 144 to prevent packets corresponding to the one or more criteria specified by Rule: TI003 (e.g., packets corresponding to the network-threat-indicators associated with Threat ID: Threat_3) from continuing toward their respective destinations).

Figure 6C:
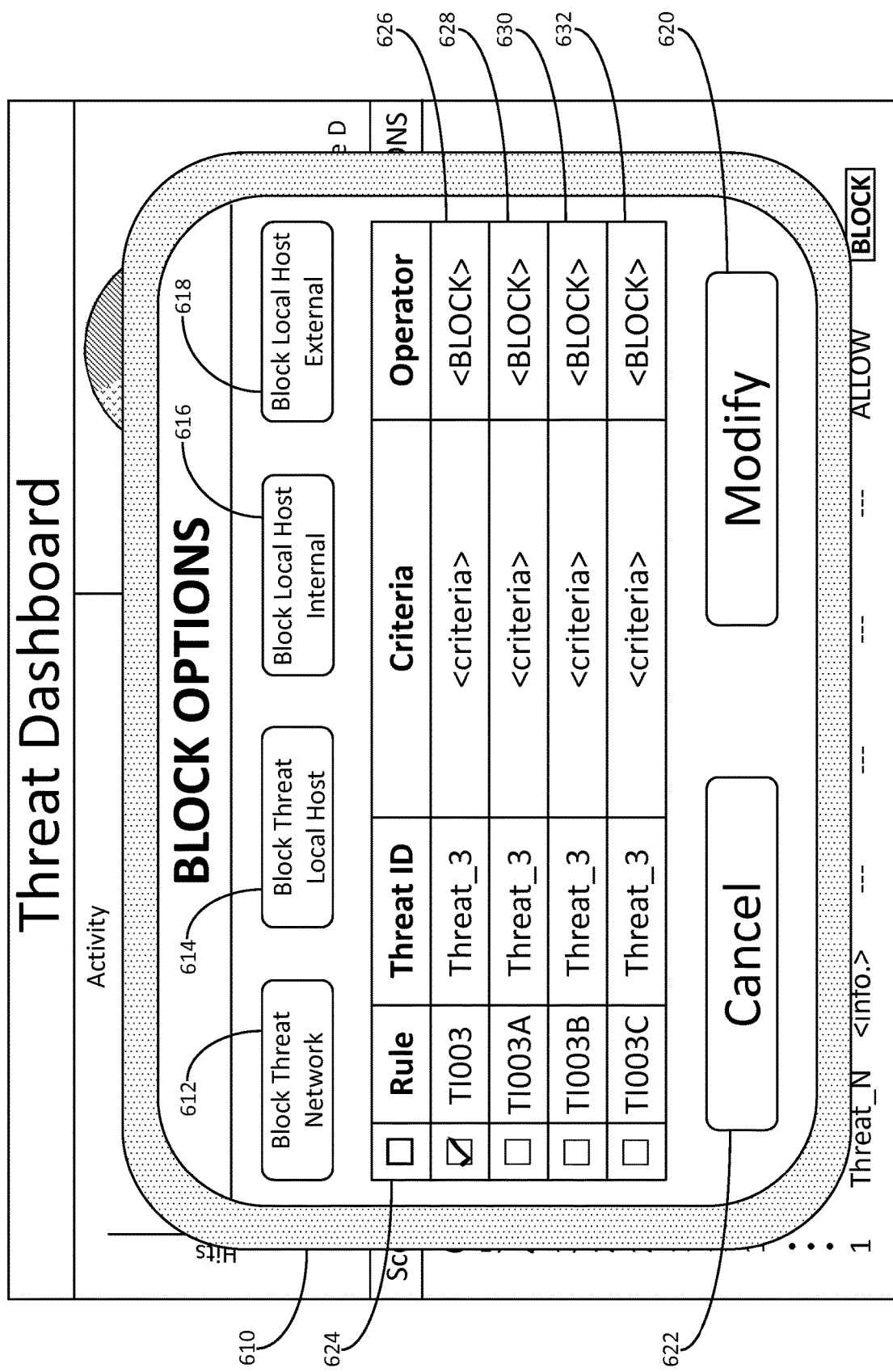

Additionally or alternatively, when invoked, such a block option may cause host 110 to display another interface (e.g., an overlay, pop-up interface, or the like) associated with packet-filtering device 144. For example, referring to FIG. 6C, when invoked, block option 608 may cause host 110 to display interface 610. Interface 610 may comprise specific block options 612, 614, 616, and 618, modify option 620, and cancel option 622. Specific block option 612 may correspond to an option to reconfigure packet-filtering device 144 to prevent packets corresponding to the network threat and destined for or originating from a host in network 102 from continuing toward their respective destinations. Specific block option 614 may correspond to an option to reconfigure packet-filtering device 144 to prevent packets corresponding to the network threat and destined for or originating from one or more particular hosts in network 102 that have generated or received packets associated with the network threat (e.g., host 112) from continuing toward their respective destinations. Specific block option 616 may correspond to an option to reconfigure packet-filtering device 144 to prevent any packets received from the particular hosts in network 102 that have generated or received packets associated with the network threat from continuing toward hosts located in network 102. And specific block option 618 may correspond to an option to reconfigure packet-filtering device 144 to prevent any packets received from the particular hosts in network 102 that have generated or received packets associated with the network threat from continuing toward hosts located in network 108.

Interface 610 may also include rule-preview listing 624, which may display a listing of rules that will be implemented by packet-filtering device 144 in response to the user invoking modify option 620. Rule-preview listing 624 may include one or more entries corresponding to each of specific block options 612, 614, 616, and 618. For example, entry 626 may correspond to, and display a rule configured to implement, specific block option 612 (e.g., Rule: TI003 with its operator reconfigured to BLOCK). Similarly, entries 628, 630, and 632 may correspond to, and display rules configured to implement, specific block options 614, 616, and 618 (e.g., one or more new rules generated by packet-filtering device 144 based on data derived from flow log 504 (e.g., a network address associated with host 112)). Responsive to a user invoking one or more of specific block options 612, 614, 616, or 618, the interface may select the corresponding rules, and responsive to a user invoking modify option 620, host 110 may instruct packet-filtering device 144 to implement the selected rules. Responsive to a user invoking cancel option 620, host 110 may redisplay interface 600.

Returning to FIG. 3C, at step 25, host 110 may communicate instructions to packet-filtering device 144 instructing packet-filtering device 144 to reconfigure one or more of packet-filtering rules 404 (e.g., to reconfigure the operator of Rule: TI003 to BLOCK), and, at step 26, packet-filtering device 144 may reconfigure packet-filtering rules 404 accordingly, as reflected in FIG. 4B.

At step 27, three packets destined for threat host 136 may be communicated by host 112, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., the BLOCK operator) to each of the three packets, prevent each of the three packets from continuing toward its respective destination (e.g., toward threat host 136), and generate log data for each of the three packets.

At step 28, packet-filtering device 144 may continue processing the log data generated in step 22 and may begin processing the log data generated in step 27. For example, referring to FIG. 5D, packet-filtering device 144 may generate entries in packet log 502 for each of the packets received in step 27 while generating an entry in flow log 504 for the packets received in step 22 based on the entries generated in packet log 502 (e.g., in step 23) for the packets received in step 22.

Figure 6D:
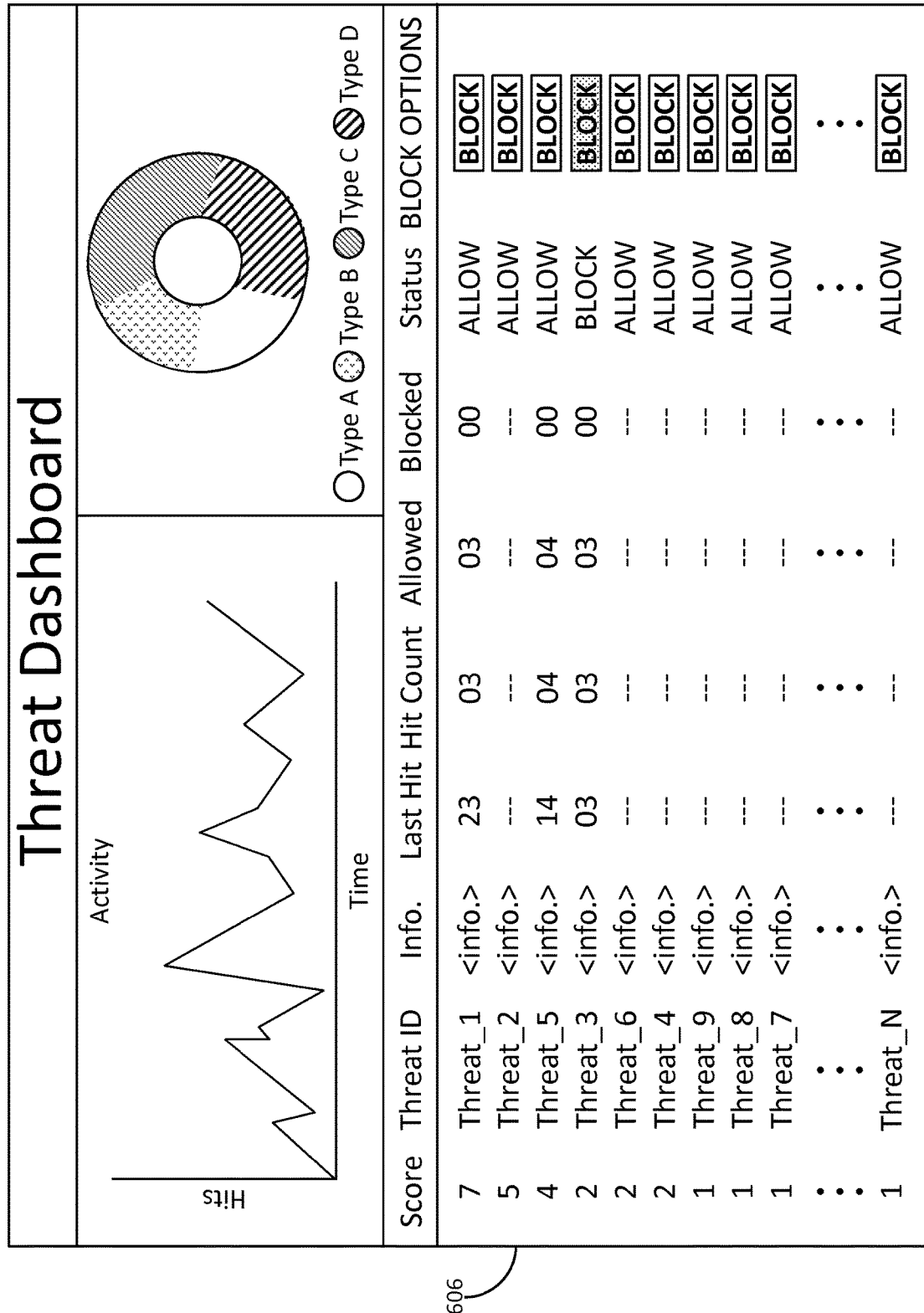

Returning to FIG. 3C, at step 29, packet-filtering device 144 may utilize flow log 504 to generate data comprising an update for interface 600 and may communicate the data to host 110. For example, referring to FIG. 6D, the update may cause interface 600 to update an entry in listing 606 that is associated with the threat associated with Threat ID: Threat_1 to reflect the packets received in step 22, the change in the operator of the packet-filtering rule associated with the threat associated with Thread ID: Threat_3, a new score (e.g., 7) assigned by packet-filtering device 144 to the threat associated with Threat ID: Threat_1 (e.g., the score may have increased based on the packets received in step 22), a new score (e.g., 2) assigned by packet-filtering device 144 to the threat associated with Threat ID: Threat_3 (e.g., the score may have decreased based on the change of the operator in its associated packet-filtering rule), a new score (e.g., 4) assigned by packet-filtering device 144 to the threat associated with Threat ID: Threat_5, and a revised ordering, determined by packet-filtering device 144 based on the new scores.

Figure 3D:
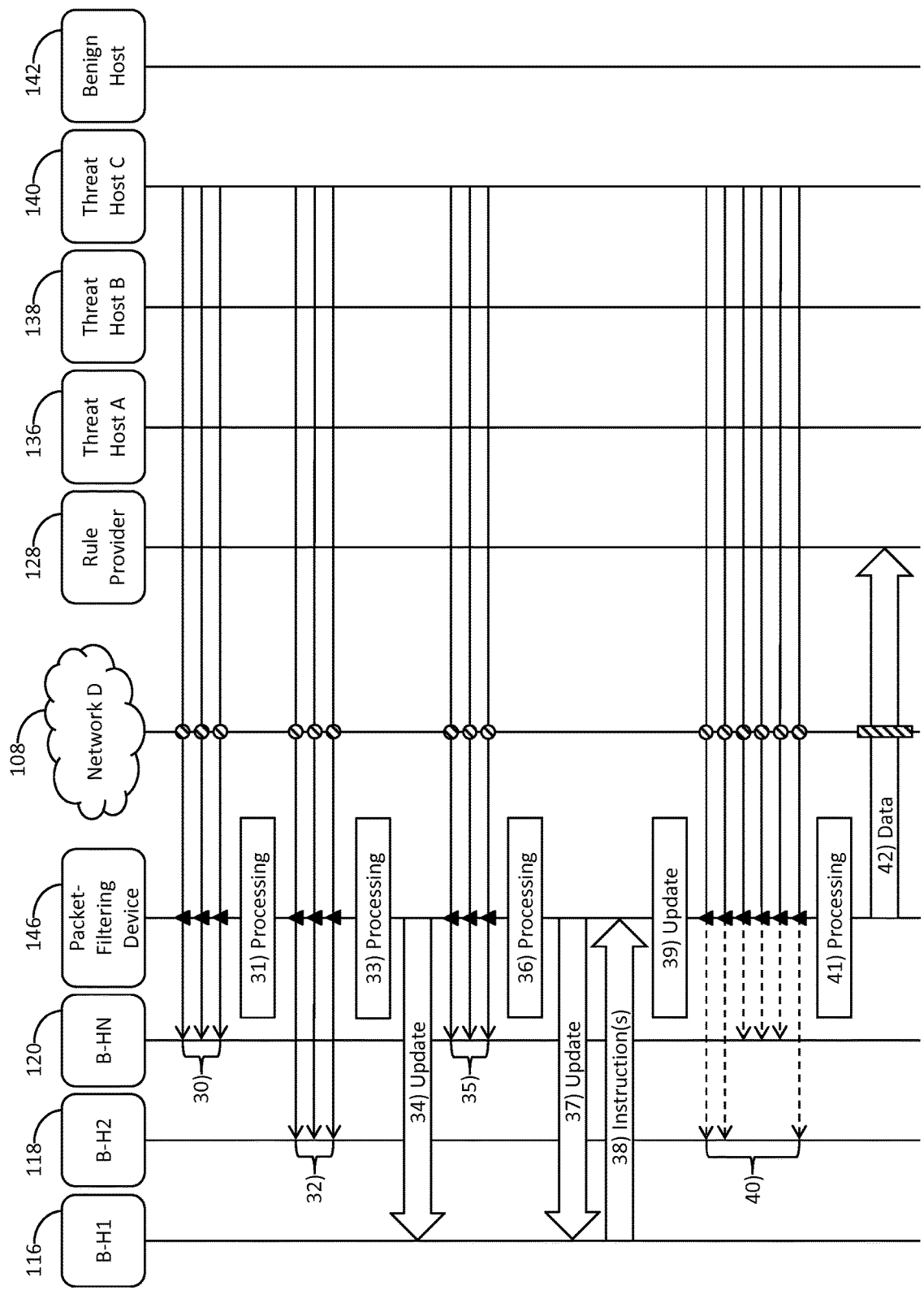

Referring to FIG. 3D, at step 30, three packets destined for host 120 may be communicated by threat host 140, and packet-filtering device 146 may receive each of the three packets, apply one or more of its packet-filtering rules to the three packets, determine that each of the three packets corresponds to criteria specified by a packet-filtering rule (e.g., a rule corresponding to Threat ID: Threat_1), apply an operator specified by the packet-filtering rule (e.g., an ALLOW operator) to each of the three packets, allow each of the three packets to continue toward its respective destination (e.g., toward host 120), and generate log data for each of the three packets. At step 31, packet-filtering device 146 may begin processing the log data generated in step 30.

At step 32, three packets destined for host 118 may be communicated by threat host 140, and packet-filtering device 146 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 118), and generate log data for each of the three packets.

At step 33, packet-filtering device 146 may continue processing the log data generated in step 30 and may begin processing the log data generated in step 33. At step 34, packet-filtering device 146 may generate data comprising an update for an interface associated with packet-filtering device 146 and displayed by host 116 (e.g., an interface similar to interface 600) and may communicate the data comprising the update to host 116.

At step 35, three packets destined for host 120 may be communicated by threat host 140, and packet-filtering device 146 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 120), and generate log data for each of the three packets. At step 36, packet-filtering device 146 may continue processing the log data generated in step 32 and may begin processing the log data generated in step 35.

At step 37, packet-filtering device 146 may generate data comprising an update for the interface associated with packet-filtering device 146 and displayed by host 116 and may communicate the data comprising the update to host 116. At step 38, host 116 may communicate instructions to packet-filtering device 146 instructing packet-filtering device 146 to reconfigure one or more of its packet-filtering rules (e.g., to reconfigure the operator of the rule corresponding to Threat ID: Threat_1 to BLOCK), and, at step 39, packet-filtering device 146 may reconfigure its packet-filtering rules accordingly.

At step 40, three packets destined for host 118 and three packets destined for host 120 may be communicated by threat host 140, and packet-filtering device 146 may receive each of the six packets, apply one or more of its packet-filtering rules to the six packets, determine that each of the six packets corresponds to criteria specified by a packet-filtering rule (e.g., the rule corresponding to Threat ID: Threat_1), apply an operator specified by the packet-filtering rule (e.g., the BLOCK operator) to each of the six packets, prevent each of the six packets from continuing toward its respective destination, and generate log data for each of the six packets. At step 41, packet-filtering device 146 may continue processing the log data generated in step 35 and may begin processing the log data generated in step 40.

At step 42, packet-filtering device 146 may communicate data to rule provider 128 (e.g., data indicating that fifteen packets corresponding to Threat ID: Threat_1 were received by packet-filtering device 146, packet-filtering device 146 allowed nine of the fifteen packets to continue toward hosts in network 104, and packet-filtering device 146 prevented six of the fifteen packets from continuing toward hosts in network 104).

Figure 3E:
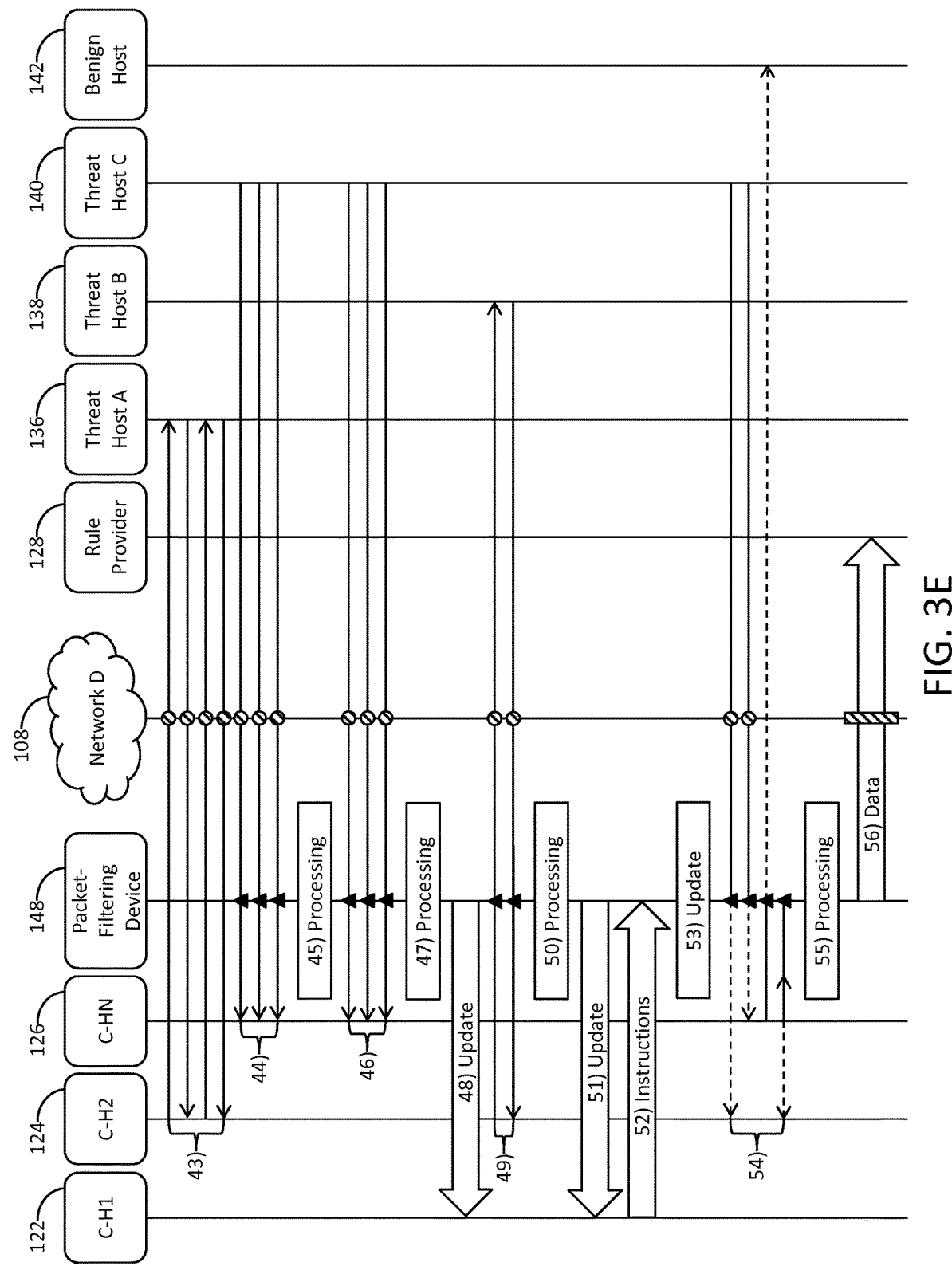

Referring to FIG. 3E, at step 43, four packets may be communicated between host 124 and threat host 136 (e.g., two packets originating from host 124 and destined for threat host 136 and two packets originating from threat host 136 and destined for host 124), and packet-filtering device 148 may receive each of the four packets, apply one or more of its packet-filtering rules to the four packets, and allow the four packets to continue toward their respective destinations.

At step 44, three packets destined for host 126 may be communicated by threat host 140, and packet-filtering device 148 may receive each of the three packets, apply one or more of its packet-filtering rules to the three packets, determine that each of the three packets corresponds to criteria specified by a packet-filtering rule (e.g., a rule corresponding to Threat ID: Threat_1), apply an operator specified by the packet-filtering rule (e.g., an ALLOW operator) to each of the three packets, allow each of the three packets to continue toward its respective destination (e.g., toward host 126), and generate log data for each of the three packets. At step 45, packet-filtering device 148 may begin processing the log data generated in step 44.

At step 46, three packets destined for host 126 may be communicated by threat host 140, and packet-filtering device 148 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 126), and generate log data for each of the three packets.

At step 47, packet-filtering device 148 may continue processing the log data generated in step 44 and may begin processing the log data generated in step 47. At step 48, packet-filtering device 148 may generate data comprising an update for an interface associated with packet-filtering device 148 and displayed by host 122 (e.g., an interface similar to interface 600) and may communicate the data comprising the update to host 122.

At step 49, two packets may be communicated between host 124 and threat host 138 (e.g., a packet originating from host 124 and destined for threat host 138 and a packet originating from threat host 138 and destined for host 124), and packet-filtering device 148 may receive each of the two packets, apply one or more of its packet-filtering rules to the two packets, determine that each of the two packets corresponds to criteria specified by a packet-filtering rule (e.g., a rule corresponding to Threat ID: Threat_5), apply an operator specified by the packet-filtering rule (e.g., an ALLOW operator) to each of the two packets, allow each of the two packets to continue toward its respective destination, and generate log data for each of the two packets. At step 50, packet-filtering device 148 may continue processing the log data generated in step 46 and may begin processing the log data generated in step 49.

At step 51, packet-filtering device 148 may generate data comprising an update for the interface associated with packet-filtering device 148 and displayed by host 122 and may communicate the data comprising the update to host 122. At step 52, host 122 may communicate instructions to packet-filtering device 148 instructing packet-filtering device 148 to reconfigure one or more of its packet-filtering rules to block all packets corresponding to the network-threat indicators associated with Threat ID: Threat_1 (e.g., to reconfigure the operator of the rule corresponding to Threat ID: Threat_1 to BLOCK), and to implement one or more new packet-filtering rules configured to block all packets originating from host 126, and, at step 53, packet-filtering device 148 may reconfigure its packet-filtering rules accordingly.

At step 54, threat host 140 may generate a packet destined for host 124 and a packet destined for host 126, host 126 may generate a packet destined for benign host 142 and a packet destined for host 124, and packet-filtering device 148 may receive each of the four packets, apply one or more of its packet-filtering rules to the four packets, determine that the packets generated by threat host 140 correspond to criteria specified by the packet-filtering rule corresponding to Threat ID: Threat_1, apply an operator specified by the packet-filtering rule corresponding to Threat ID: Threat_1 (e.g., the BLOCK operator) to each of the two packets generated by threat host 140, determine that the packets generated by host 126 correspond to criteria specified by the new packet-filtering rules (e.g., a network address associated with host 126), apply an operator specified by the new packet-filtering rules (e.g., the BLOCK operator) to each of the two packets generated by host 126, prevent each of the four packets from continuing toward its respective destination, and generate log data for each of the four packets.

At step 55, packet-filtering device 148 may continue processing the log data generated in step 49 and may begin processing the log data generated in step 54. At step 56, packet-filtering device 148 may communicate data to rule provider 128 (e.g., data indicating that eight packets corresponding to Threat ID: Threat_1 were received by packet-filtering device 148, packet-filtering device 148 allowed six of the eight packets to continue toward hosts in network 106, packet-filtering device 148 prevented two of the eight packets from continuing toward hosts in network 106, two packets corresponding to Threat ID: Threat_5 were received by packet-filtering device 148, and packet-filtering device 148 allowed both of the two packets to continue toward their respective destinations).

Figure 3F:
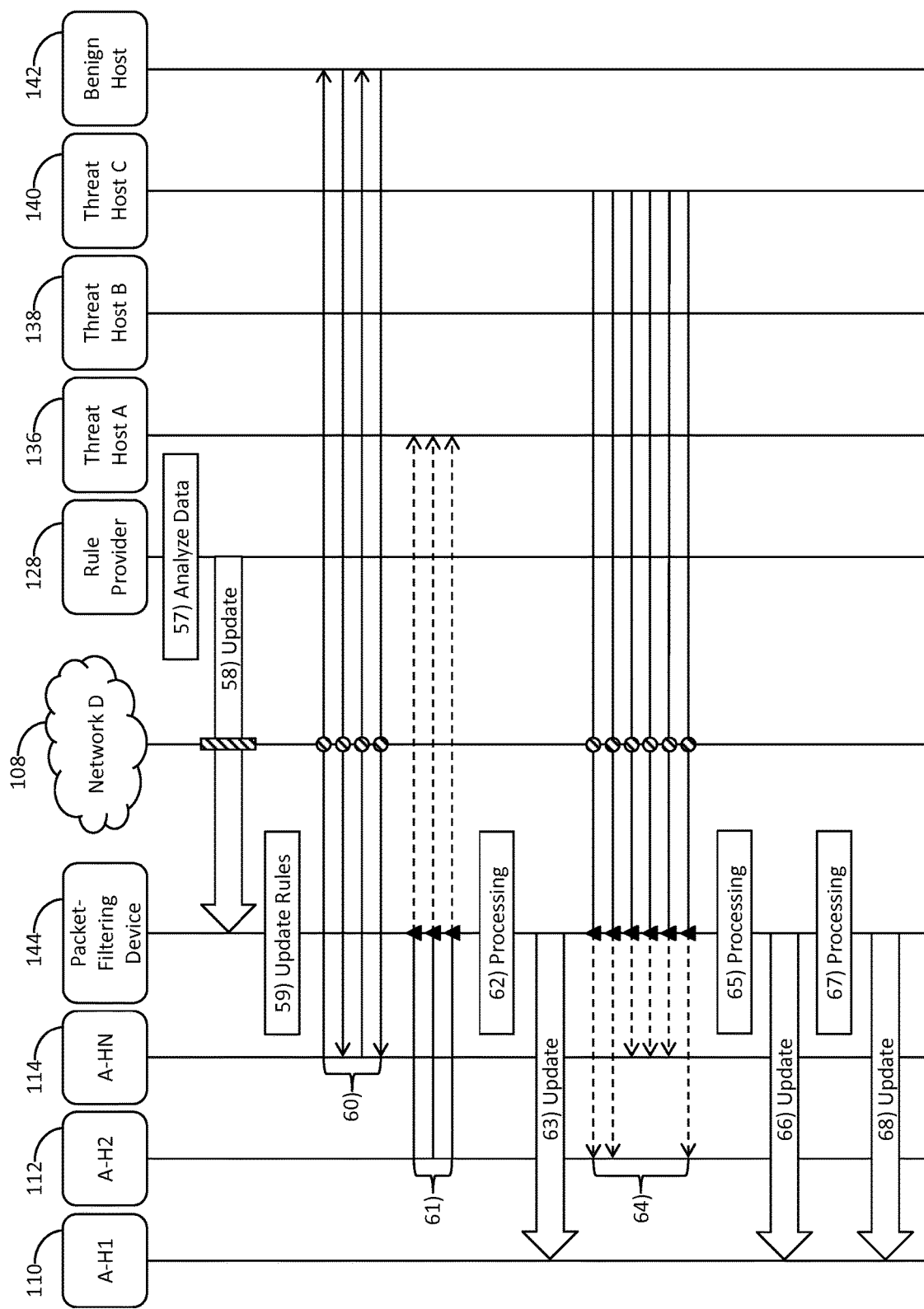

Referring to FIG. 3F, at step 57, rule provider 128 (e.g., computing devices 222) may analyze the data received from packet-filtering devices 146 and 148 (e.g., in steps 42 and 56, respectively) and may generate, based on the analysis, an update for packet-filtering device 148. In some embodiments, the update may be configured to cause packet-filtering device 144 to reconfigure an operator of a packet-filtering rule included in packet-filtering rules 404 (e.g., to reconfigure packet-filtering device 144 to prevent packets corresponding to the criteria specified by the rule from continuing toward their respective destinations). Additionally or alternatively, the update may reconfigure one or more of packet-filtering rules 404 to affect the ordering (e.g., the scoring) of the network threats associated with packet-filtering rules 404. At step 58, rule provider 128 may communicate the updates to packet-filtering device 144, which may receive the updates and, at step 59, may update packet-filtering rules 404 accordingly. For example, the update may be configured to cause packet-filtering device 144 to reconfigure the operator of Rule: TI001 to the BLOCK operator (e.g., to reconfigure packet-filtering device 144 to prevent packets corresponding to the network-threat indicators associated with the network threat corresponding to Threat ID: Threat_1 from continuing toward their respective destinations, and packet-filtering device 144 may reconfigure packet-filtering rules 404 accordingly, as reflected in FIG. 4C).

At step 60, four packets may be communicated between host 114 and benign host 142 (e.g., two packets originating from host 114 and destined for benign host 142 and two packets originating from benign host 142 and destined for host 114), and packet-filtering device 144 may receive each of the four packets, apply one or more of packet-filtering rules 218 to the four packets, and allow the four packets to continue toward their respective destinations.

At step 61, three packets destined for threat host 136 may be communicated by host 112, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., the BLOCK operator) to each of the three packets, prevent each of the three packets from continuing toward its respective destination (e.g., toward threat host 136), and generate log data for each of the three packets.

At step 62, packet-filtering device 144 may continue processing the log data generated in step 27 and may begin processing the log data generated in step 62. For example, referring to FIG. 5E, packet-filtering device 144 may generate entries in packet log 502 for each of the packets received in step 61 while modifying an entry in flow log 504 for the packets received in step 27 based on the entries generated in packet log 502 (e.g., in step 28) for the packets received in step 27, for example, modifying the entry corresponding to Threat ID: Threat_3) (e.g., the time range and the count of associated packets prevented by packet-filtering device 144 from continuing toward their respective destinations).

Figure 6E:
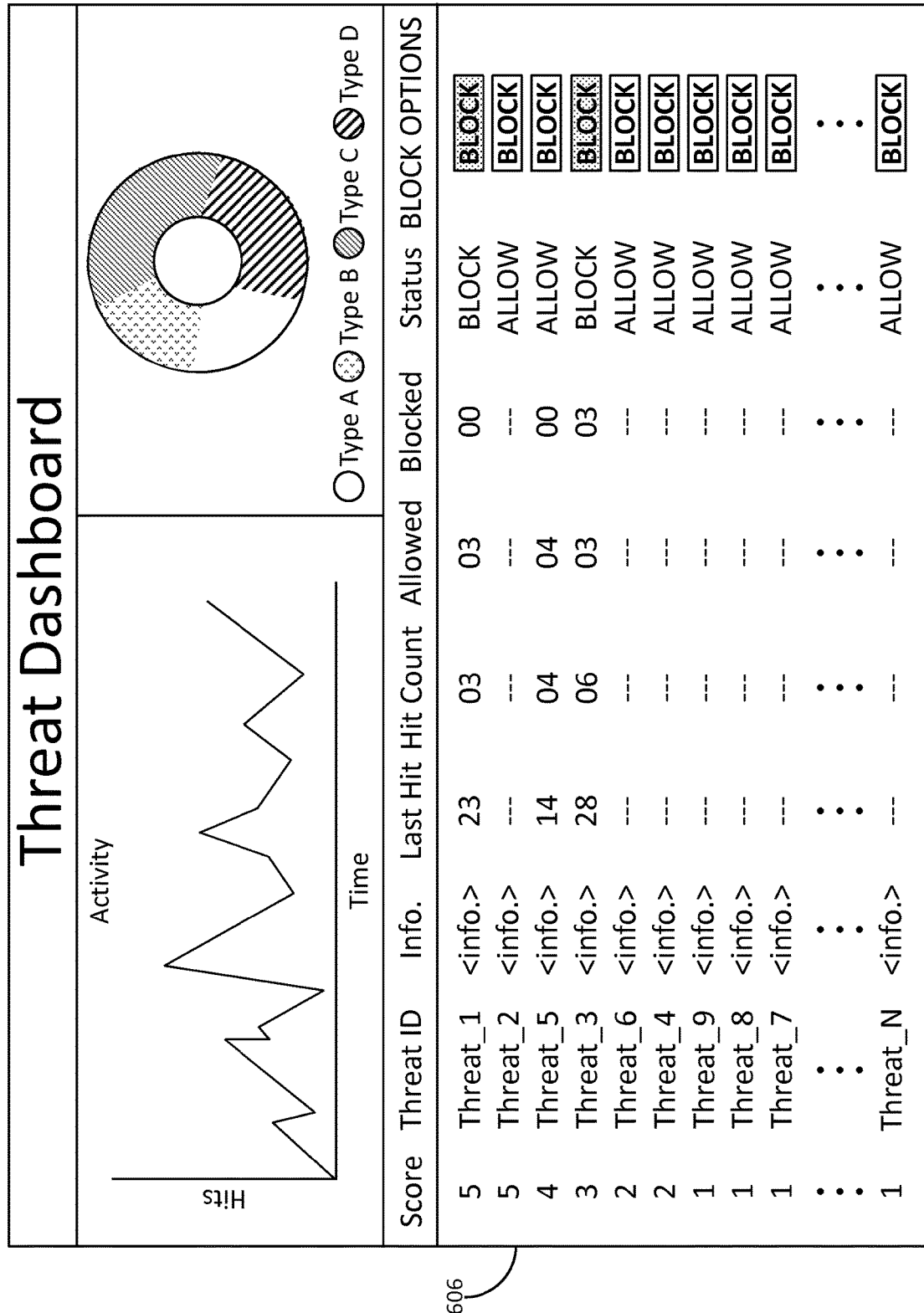

At step 63, packet-filtering device 144 may utilize flow log 504 to generate data comprising an update for interface 600 and may communicate the data to host 110. For example, referring to FIG. 6E, the update may cause interface 600 to update the entry in listing 606 associated with Threat ID: Threat_3 to reflect the packets received in step 27, the change in the operator of the packet-filtering rule associated with Thread ID: Threat_1, a new score (e.g., 3) assigned by packet-filtering device 144 to the threat associated with Threat ID: Threat_3 (e.g., the score may have increased based on the packets received in step 27), and a new score (e.g., 5) assigned by packet-filtering device 144 to the threat associated with Threat ID: Threat_1 (e.g., the score may have decreased based on the change of the operator in its associated packet-filtering rule).

At step 64, three packets destined for host 112 and three packets destined for host 114 may be communicated by threat host 140, and packet-filtering device 144 may receive each of the six packets, apply one or more of packet-filtering rules 218 to the three packets, determine that each of the three packets corresponds to criteria specified by a packet-filtering rule of packet-filtering rules 404 (e.g., Rule: T1001), apply an operator specified by the packet-filtering rule (e.g., the BLOCK operator) to each of the six packets, prevent each of the six packets from continuing toward its respective destination, and generate log data for each of the six packets.

Figure 5F:
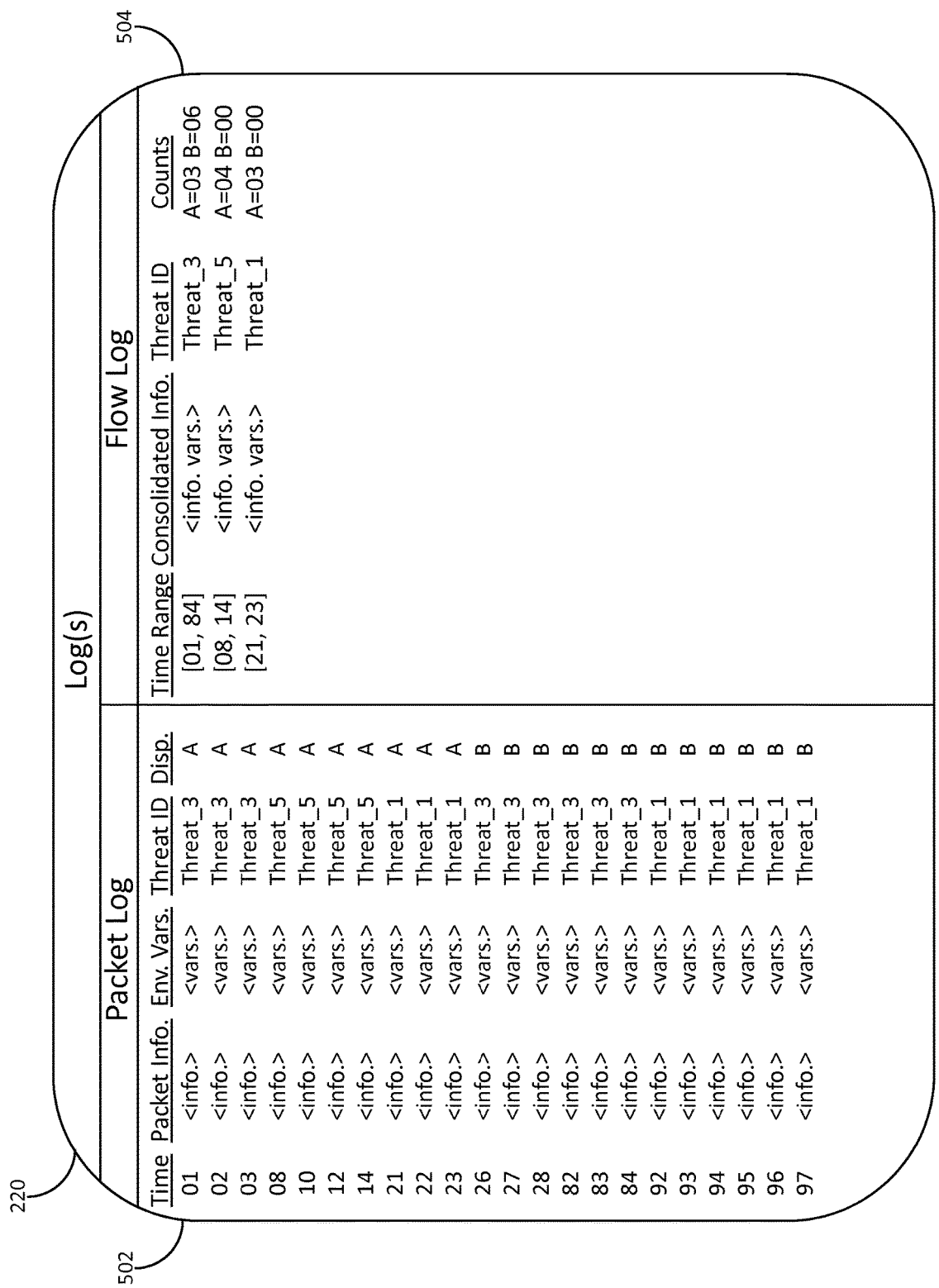

At step 65, packet-filtering device 144 may continue processing the log data generated in step 61 and may begin processing the log data generated in step 64. For example, referring to FIG. 5F, packet-filtering device 144 may generate entries in packet log 502 for each of the packets received in step 64 while modifying an entry in flow log 504 for the packets received in step 61 based on the entries generated in packet log 502 (e.g., in step 62) for the packets received in step 61, for example, modifying the entry corresponding to Threat ID: Threat_3 (e.g., the time range and the count of associated packets prevented by packet-filtering device 144 from continuing toward their respective destinations).

Figure 6F:
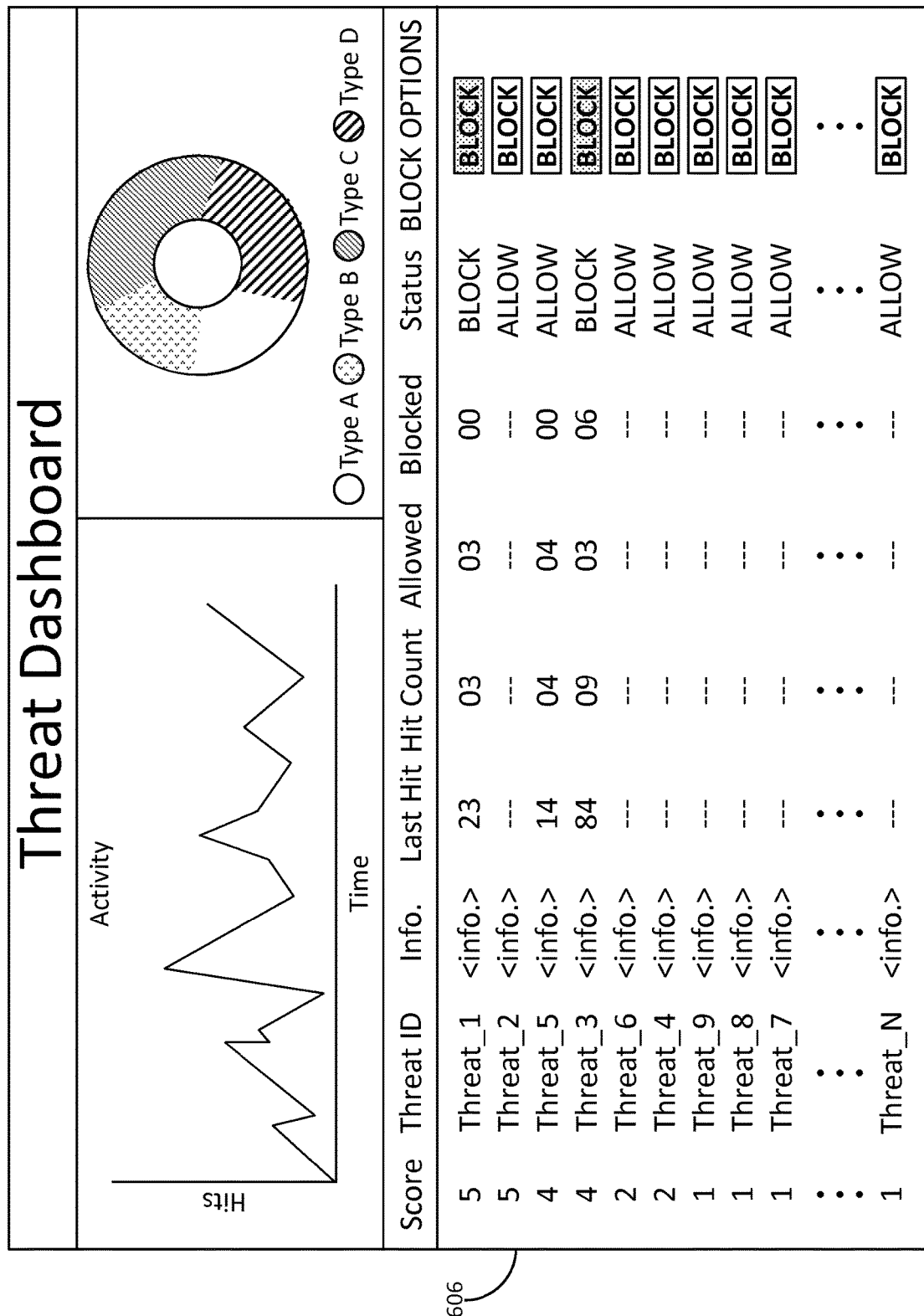

At step 66, packet-filtering device 144 may utilize flow log 504 to generate data comprising an update for interface 600 and may communicate the data to host 110. For example, referring to FIG. 6F, the update may cause interface 600 to update the entry in listing 606 associated with Threat ID: Threat_3 to reflect the packets received in step 61 and a new score (e.g., 3) assigned by packet-filtering device 144 to the threat associated with Threat ID: Threat_3 (e.g., the score may have increased based on the packets received in step 61).

Figure 5G:
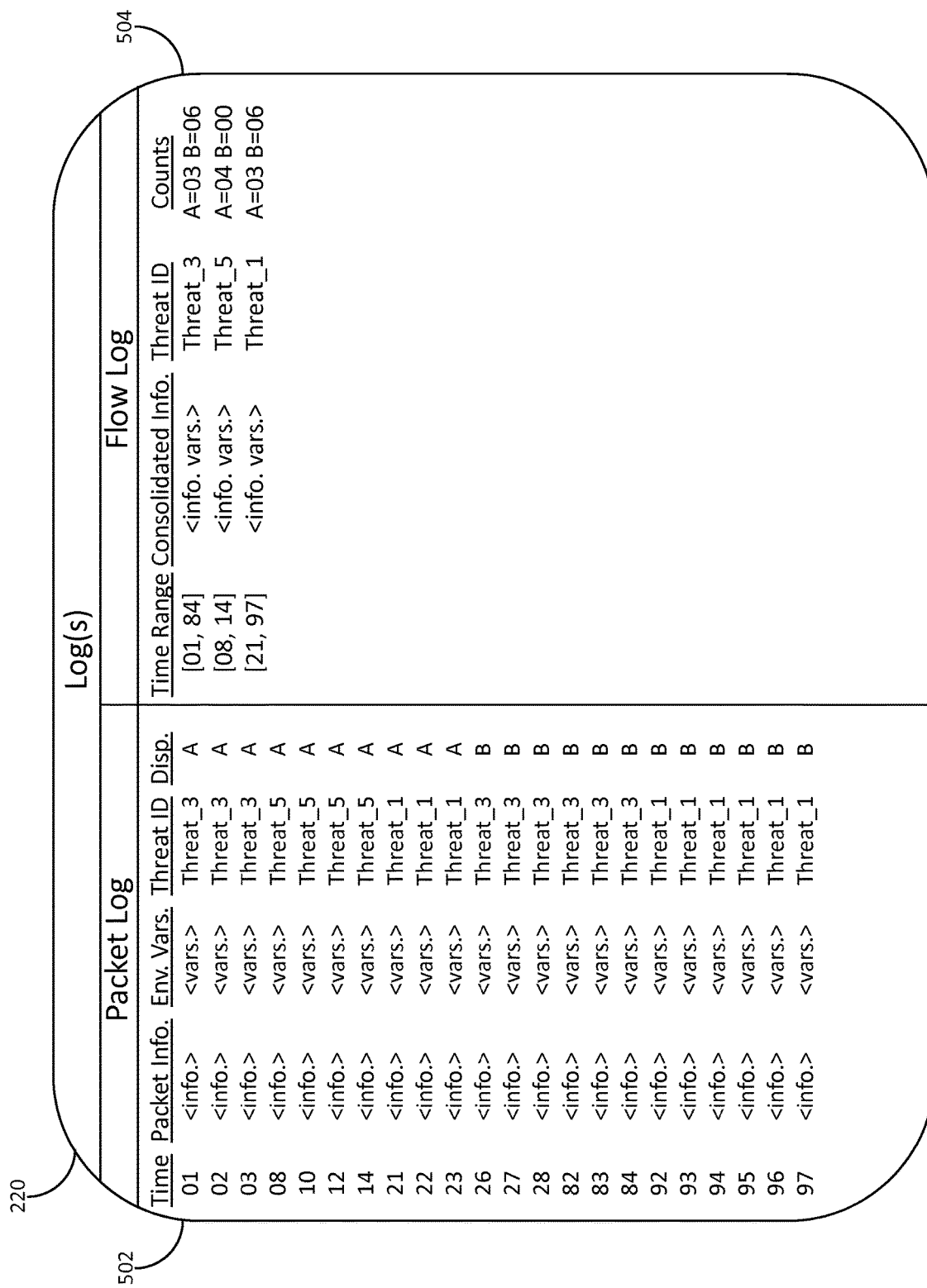

At step 67, packet-filtering device 144 may continue processing the log data generated in step 64. For example, referring to FIG. 5G, packet-filtering device 144 may modify an entry in flow log 504 for the packets received in step 64 based on the entries generated in packet log 502 (e.g., in step 65) for the packets received in step 64, for example, modifying the entry corresponding to Threat ID: Threat_1 (e.g., the time range and the count of associated packets prevented by packet-filtering device 144 from continuing toward their respective destinations).

Figure 6G:
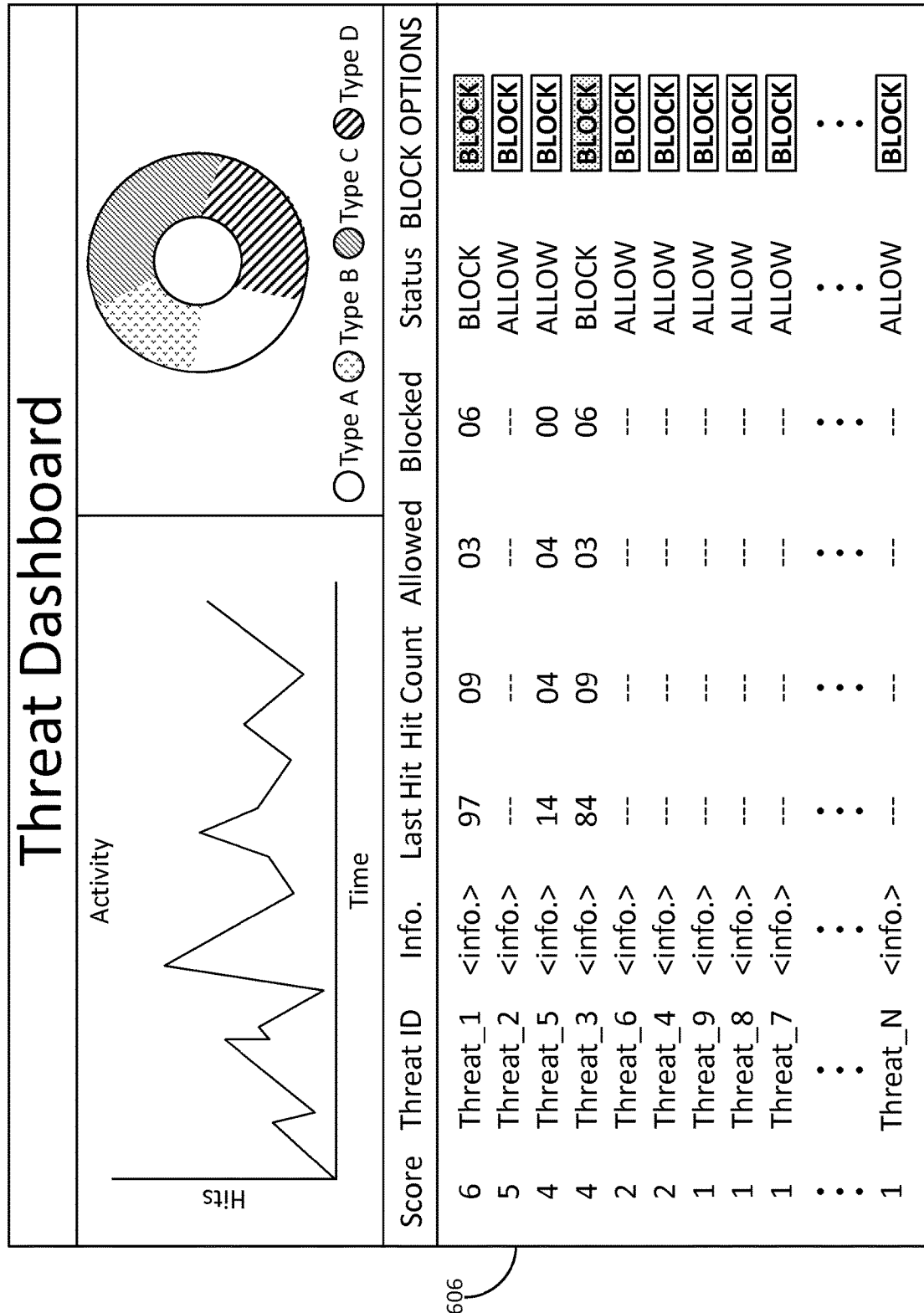

At step 68, packet-filtering device 144 may utilize flow log 504 to generate data comprising an update for interface 600 and may communicate the data to host 110. For example, referring to FIG. 6G, the update may cause interface 600 to update the entry in listing 606 associated with Threat ID: Threat_1 to reflect the packets received in step 64 and a new score (e.g., 6) assigned by packet-filtering device 144 to the threat associated with Threat ID: Threat_1 (e.g., the score may have increased based on the packets received in step 64).

Figure 7:
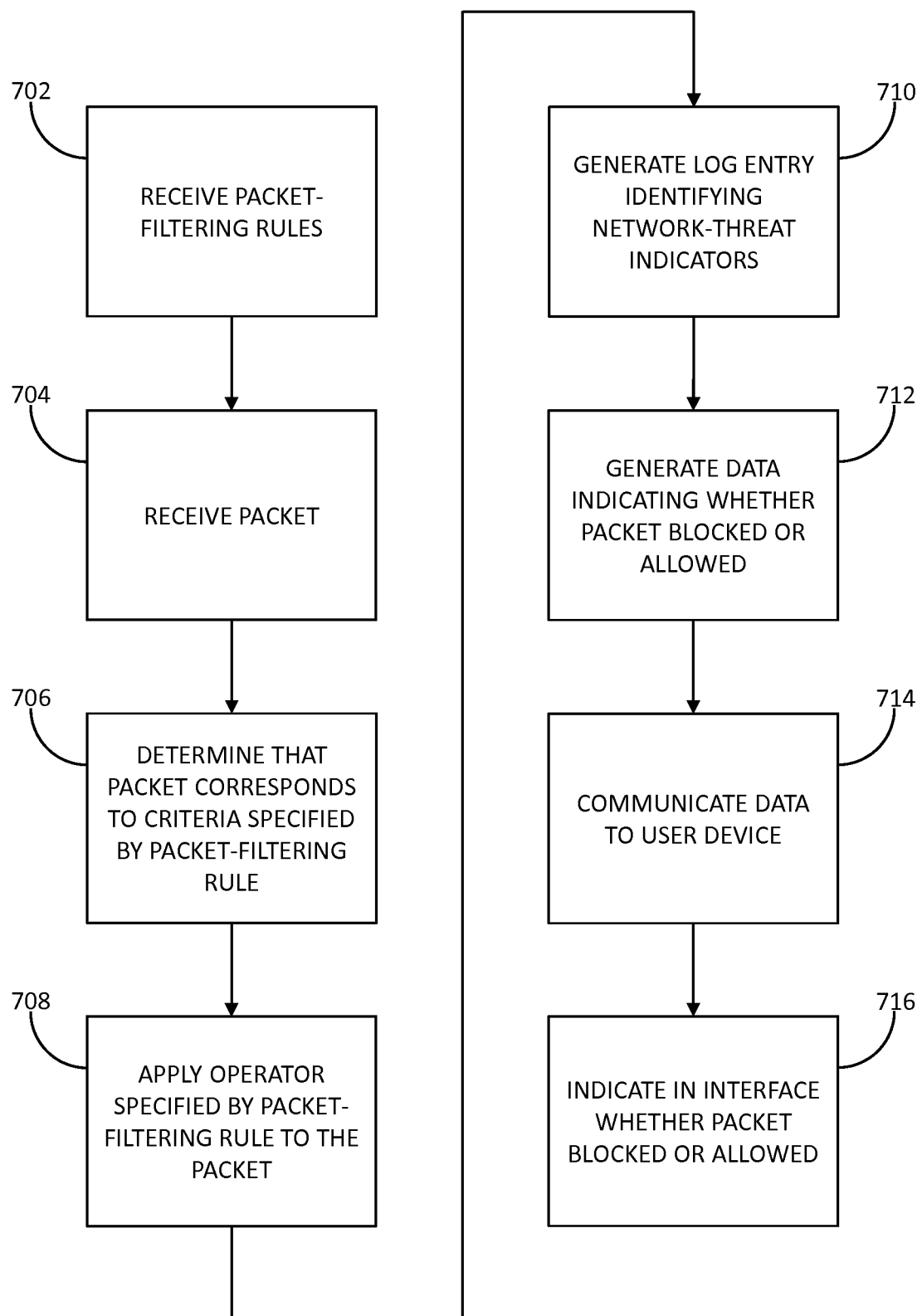
FIG. 7 depicts an illustrative method for rule-based network-threat detection in accordance with one or more aspects of the disclosure.

FIG. 7 depicts an illustrative method for rule-based network-threat detection in accordance with one or more aspects of the disclosure. Referring to FIG. 7, at step 702, a packet-filtering device may receive a plurality of packet-filtering rules configured to cause the packet-filtering device to identify packets corresponding to one or more network-threat indicators. For example, packet-filtering device 144 may receive packet-filtering rules 404 from rule provider 128. At step 704, the packet-filtering device may receive a packet corresponding to at least one of the network-threat indicators. For example, packet-filtering device 144 may receive a packet generated by host 112 and destined for threat host 136. At step 706, the packet-filtering device may determine that the packet corresponds to criteria specified by one of the plurality of packet-filtering rules. For example, packet-filtering device 144 may determine that the packet generated by host 112 and destined for threat host 136 corresponds to Rule: T1003. At step 708, the packet-filtering device may apply an operator specified by the packet-filtering rule to the packet. For example, packet-filtering device 144 may apply an operator (e.g., an ALLOW operator) specified by Rule: T1003 to the packet generated by host 112 and may allow the packet generated by host 112 to continue toward threat host 136.

At step 710, the packet-filtering device may generate a log entry comprising information from the packet-filtering rule that is distinct from the criteria and identifies the one or more network-threat indicators. For example, packet-filtering device 144 may generate an entry in packet log 502 comprising Threat ID: Threat_3 for the packet generated by host 112. At step 712, the packet-filtering device may generate data indicating whether the packet-filtering device prevented the packet from continuing toward its destination (e.g., blocked the packet) or allowed the packet to continue toward its destination. For example, packet-filtering device 144 may generate data comprising an update for interface 600 that indicates that packet-filtering device 144 allowed the packet generated by host 112 to continue toward threat host 136. At step 714, the packet-filtering device may communicate the data to a user device. For example, packet-filtering device 144 may communicate the data comprising the update for interface 600 to host 110. At step 716, the packet-filtering device may indicate in an interface whether the packet-filtering device prevented the packet from continuing toward its destination or allowed the packet to continue toward its destination. For example, communicating the data comprising the update for interface 600 may cause host 110 to indicate in interface 600 that packet-filtering device 144 allowed the packet generated by host 112 to continue toward threat host 136.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
receiving, by a packet filtering device, a plurality of packet filtering rules configured to cause the packet filtering device to identify packets corresponding to at least one of a plurality of network-threat indicators, wherein the plurality of network-threat indicators are associated with network-threat-intelligence reports supplied by one or more independent network-threat-intelligence providers;
receiving, by the packet filtering device, a plurality of packets that comprises a first packet and a second packet;
responsive to a determination by the packet filtering device that the first packet satisfies a first packet filtering rule, of the plurality of packet filtering rules, based on one or more network-threat indicators, of the plurality of network-threat indicators, specified by the first packet filtering rule:
applying, by the packet filtering device and to the first packet, an operator specified by the first packet filtering rule and configured to cause the packet filtering device to allow the first packet to continue toward a destination of the first packet; and
communicating, by the packet filtering device, information that identifies the one or more network-threat indicators and data indicative that the first packet was allowed to continue toward the destination of the first packet;
receiving, by the packet filtering device, an update to at least one packet filtering rule;
modifying, by the packet filtering device and based on the received update to the at least one packet filtering rule, at least one operator specified by the first packet filtering rule to reconfigure the packet filtering device to prevent packets corresponding to the one or more network-threat indicators from continuing toward their respective destinations; and
responsive to a determination by the packet filtering device that the second packet satisfies the first packet filtering rule:
preventing, by the packet filtering device and based on the modified at least one operator specified by the first packet filtering rule, the second packet from continuing toward a destination of the second packet; and
communicating, by the packet filtering device, data indicative that the second packet was prevented from continuing toward the destination of the second packet.

2. The method of claim 1, further comprising:
causing, by the packet filtering device and in a user interface, display of data indicative that the first packet was allowed to continue toward the destination of the first packet; and
causing, by the packet filtering device and in the user interface, display of second data indicative that the second packet was prevented from continuing toward the destination of the second packet.

3. The method of claim 1, further comprising:
generating, by the packet filtering device and responsive to the determination by the packet filtering device that the first packet satisfies the first packet filtering rule, a packet log entry comprising a first threat identifier corresponding to the first packet and data indicating that the packet filtering device allowed the first packet to continue toward the destination of the first packet.

4. The method of claim 3, further comprising:
updating, by the packet filtering device and responsive to the determination by the packet filtering device that the first packet satisfies the first packet filtering rule, a packet flow entry corresponding to the generated packet log entry,
wherein the packet flow entry consolidates a plurality of packet log entries commonly corresponding to the first threat identifier.

5. The method of claim 1, wherein each of the plurality of network-threat indicators corresponds to a respective network threat of a plurality of network threats, the method further comprising:
for each packet of the plurality of packets and responsive to a determination by the packet filtering device that a packet satisfies a packet filtering rule:
generating, by the packet filtering device, a packet log entry comprising information from the packet filtering rule, wherein the information identifies:
the packet filtering rule, and
whether the packet filtering device prevented the packet from continuing toward a destination of the packet or allowed the packet to continue toward
the destination of the packet; and
updating, by the packet filtering device and based on
the packet log entry, a packet flow log to indicate:
the determination that the packet satisfies the packet
filtering rule, and
whether the packet filtering device prevented the
packet from continuing toward a destination of the
packet or allowed the packet to continue toward
the destination of the packet.

6. The method of claim 5, further comprising:
determining, by the packet filtering device and based on
data of the packet flow log, an ordering of the plurality
of network threats; and
communicating, by the packet filtering device, data
indicative of the ordering of the plurality of network
threats.

7. The method of claim 6, wherein determining the
ordering comprises, for each network threat of the plurality
of network threats, at least one of:
determining a number of packets corresponding to the
network threat that were allowed by the packet filtering
device to continue toward their respective destinations;
determining a number of packets corresponding to the
network threat that were prevented by the packet filtering device from continuing toward their respective
destinations;
determining a time indicated by the data stored in the
packet flow log at which the packet filtering device last
identified a packet corresponding to the network threat;
or
determining a number of network-threat-intelligence
reports corresponding to the network threat.

8. A packet filtering device comprising:
at least one processor; and
memory comprising instructions that, when executed by
the at least one processor, cause the packet filtering
device to:
receive a plurality of packet filtering rules configured to
cause the packet filtering device to identify packets
corresponding to at least one of a plurality of network-threat indicators, wherein the plurality of network-threat indicators are associated with network-threat-intelligence reports supplied by one or more
independent network-threat-intelligence providers;
receive a plurality of packets that comprises a first
packet and a second packet;
responsive to a determination that the first packet
satisfies a first packet filtering rule, of the plurality of
packet filtering rules, based on one or more network-threat indicators, of the plurality of network-threat
indicators, specified by the first packet filtering rule:
apply, to the first packet, an operator specified by the
first packet filtering rule and configured to cause
the packet filtering device to allow the first packet
to continue toward a destination of the first packet;
and
communicate information that identifies the one or
more network-threat indicators and data indicative
that the first packet was allowed to continue
toward the destination of the first packet;
receive an update to at least one packet filtering rule;
modify, based on the received update to the at least one
packet filtering rule, at least one operator specified
by the first packet filtering rule to reconfigure the
packet filtering device to prevent packets corresponding to the one or more network-threat indicators from continuing toward their respective destinations; and
responsive to a determination that the second packet
satisfies the first packet filtering rule:
based on the modified at least one operator specified
by the first packet filtering rule, prevent the second
packet from continuing toward a destination of the
second packet; and
communicate data indicative that the second packet
was prevented from continuing toward the destination of the second packet.

9. The packet filtering device of claim 8, wherein the
memory stores instructions that, when executed by the at
least one processor, further cause the packet filtering device
to:
cause, in a user interface, display of data indicative that
the first packet was allowed to continue toward the
destination of the first packet; and
cause, in the user interface, display of second data indicative that the second packet was prevented from continuing toward the destination of the second packet.

10. The packet filtering device of claim 8, wherein the
memory stores instructions that, when executed by the at
least one processor, further cause the packet filtering device
to:
generate, responsive to the determination that the first
packet satisfies the first packet filtering rule, a packet
log entry comprising a first threat identifier corresponding to the first packet and data indicating that the packet
filtering device allowed the first packet to continue
toward the destination of the first packet.

11. The packet filtering device of claim 10, wherein the
memory stores instructions that, when executed by the at
least one processor, further cause the packet filtering device
to:
update, responsive to the determination that the first
packet satisfies the first packet filtering rule, a packet
flow entry corresponding to the generated packet log
entry,
wherein the packet flow entry consolidates a plurality of
packet log entries commonly corresponding to the first
threat identifier.

12. The packet filtering device of claim 8, wherein each
of the plurality of network-threat indicators corresponds to
a respective network threat of a plurality of network threats,
wherein the memory stores instructions that, when executed
by the at least one processor, further cause the packet
filtering device to:
for each packet of the plurality of packets and responsive
to a determination by the packet filtering device that a
packet satisfies a packet filtering rule:
generate a packet log entry comprising information
from the packet filtering rule, wherein the information identifies:
the packet filtering rule, and
whether the packet filtering device prevented the
packet from continuing toward a destination of the
packet or allowed the packet to continue toward
the destination of the packet; and
update, based on the packet log entry, a packet-flow log
to indicate:
the determination that the packet satisfies the packet
filtering rule, and
whether the packet filtering device prevented the
packet from continuing toward a destination of the packet or allowed the packet to continue toward the destination of the packet.

13. The packet filtering device of claim 12, wherein the memory stores instructions that, when executed by the at least one processor, further cause the packet filtering device to:
determine, based on data of the packet flow log, an ordering of the plurality of network threats; and
communicate data indicative of the ordering of the plurality of network threats.

14. The packet filtering device of claim 13, wherein the memory stores instructions for determining the ordering that, when executed by the at least one processor, further cause the packet filtering device to, for each network threat of the plurality of network threats, at least one of:
determine a number of packets corresponding to the network threat that were allowed by the packet filtering device to continue toward their respective destinations;
determine a number of packets corresponding to the network threat that were prevented by the packet filtering device from continuing toward their respective destinations;
determine a time indicated by the data stored in the packet flow log at which the packet filtering device last identified a packet corresponding to the network threat; or
determine a number of network-threat-intelligence reports corresponding to the network threat.

15. One or more non-transitory computer-readable media comprising instructions that, when executed by one or more processors of a packet filtering device, cause the packet filtering device to:
receive a plurality of packet filtering rules configured to cause the packet filtering device to identify packets corresponding to at least one of a plurality of network-threat indicators, wherein the plurality of network-threat indicators are associated with network-threat-intelligence reports supplied by one or more independent network-threat-intelligence providers;
receive a plurality of packets that comprises a first packet and a second packet;
responsive to a determination that the first packet satisfies a first packet filtering rule, of the plurality of packet filtering rules, based on one or more network-threat indicators, of the plurality of network-threat indicators, specified by the first packet filtering rule:
apply, to the first packet, an operator specified by the first packet filtering rule and configured to cause the packet filtering device to allow the first packet to continue toward a destination of the first packet; and
communicate information that identifies the one or more network-threat indicators and data indicative that the first packet was allowed to continue toward the destination of the first packet;
receive an update to at least on packet filtering rule;
modify, based on the received update to the at least on packet filtering rule, at least one operator specified by the first packet filtering rule to reconfigure the packet filtering device to prevent packets corresponding to the one or more network-threat indicators from continuing toward their respective destinations; and
responsive to a determination that the second packet satisfies the first packet filtering rule:
based on the modified at least one operator specified by the first packet filtering rule, prevent the second packet from continuing toward a destination of the second packet; and
communicate data indicative that the second packet was prevented from continuing toward the destination of the second packet.

16. The one or more non-transitory computer-readable media of claim 15, further comprising instructions that, when executed by the one or more processors of the packet filtering device, cause the packet filtering device to:
cause, in a user interface, display of data indicative that the first packet was allowed to continue toward the destination of the first packet; and
cause, in the user interface, display of second data indicative that the second packet was prevented from continuing toward the destination of the second packet.

17. The one or more non-transitory computer-readable media of claim 15, further comprising instructions that, when executed by the one or more processors of the packet filtering device, cause the packet filtering device to:
generate, responsive to the determination that the first packet satisfies the first packet filtering rule, a packet log entry comprising a first threat identifier corresponding to the first packet and data indicating that the packet filtering device allowed the first packet to continue toward the destination of the first packet.

18. The one or more non-transitory computer-readable media of claim 17, further comprising instructions that, when executed by the one or more processors of the packet filtering device, cause the packet filtering device to:
update, responsive to the determination that the first packet satisfies the first packet filtering rule, a packet flow entry corresponding to the generated packet log entry,
wherein the packet flow entry consolidates a plurality of packet log entries commonly corresponding to the first threat identifier.

19. The one or more non-transitory computer-readable media of claim 15, wherein each of the plurality of network-threat indicators corresponds to a respective network threat of a plurality of network threats, further comprising instructions that, when executed by the one or more processors of the packet filtering device, cause the packet filtering device to:
for each packet of the plurality of packets and responsive to a determination that a packet satisfies a packet filtering rule:
generate a packet log entry comprising information from the packet filtering rule, wherein the information identifies:
the packet filtering rule, and
whether the packet filtering device prevented the packet from continuing toward a destination of the packet or allowed the packet to continue toward the destination of the packet; and
update, based on the packet log entry, a packet flow log to indicate:
the determination that the packet satisfies the packet filtering rule, and
whether the packet filtering device prevented the packet from continuing toward a destination of the packet or allowed the packet to continue toward the destination of the packet.

20. The one or more non-transitory computer-readable media of claim 19, further comprising instructions that, when executed by the one or more processors of the packet filtering device, cause the packet filtering device to:
determine, based on data of the packet flow log, an ordering of the plurality of network threats; and communicate data indicative of the ordering of the plurality of network threats.

21. The one or more non-transitory computer-readable media of claim 20, wherein the instructions that cause the packet filtering device to determine the ordering further comprise instructions that, when executed by the one or more processors of the packet filtering device, cause the packet filtering device to, for each network threat of the plurality of network threats, at least one of:
  determine a number of packets corresponding to the network threat that were allowed by the packet filtering device to continue toward their respective destinations;
  determine a number of packets corresponding to the network threat that were prevented by the packet filtering device from continuing toward their respective destinations;
  determine a time indicated by the data stored in the packet flow log at which the packet filtering device last identified a packet corresponding to the network threat; or
  determine a number of network-threat-intelligence reports corresponding to the network threat.

* * * * *

(12) INTER PARTES REVIEW CERTIFICATE (3931st)
United States Patent (10) Number: US 10,542,028 K1
Ahn et al. (45) Certificate Issued: Mar. 12, 2025

(54) RULE-BASED NETWORK-THREAT DETECTION

(71) Applicants: David K. Ahn; Keith A. George; Peter P. Geremia; Pierre Mallet, III; Sean Moore; Robert T. Perry; Jonathan R. Rogers

(72) Inventors: David K. Ahn; Keith A. George; Peter P. Geremia; Pierre Mallet, III; Sean Moore; Robert T. Perry; Jonathan R. Rogers

(73) Assignee: CENTRIPETAL NETWORKS, LLC

Trial Number:

IPR2021-01147 filed Jul. 19, 2021

Inter Partes Review Certificate for:

Patent No.: 10,542,028
Issued: Jan. 21, 2020
Appl. No.: 16/554,252
Filed: Aug. 28, 2019

The results of IPR2021-01147 are reflected in this inter partes review certificate under 35 U.S.C. 318(b).

INTER PARTES REVIEW CERTIFICATE
U.S. Patent 10,542,028 K1
Trial No. IPR2021-01147
Certificate Issued Mar. 12, 2025

AS A RESULT OF THE INTER PARTES REVIEW PROCEEDING, IT HAS BEEN DETERMINED THAT:

Claims 1-21 are cancelled.

\* \* \* \* \*